(12) United States Patent
Shinmen et al.

(10) Patent No.: US 9,920,456 B2
(45) Date of Patent: Mar. 20, 2018

(54) CARBON-FIBER-PRECURSOR FIBER BUNDLE, CARBON FIBER BUNDLE, AND USES THEREOF

(75) Inventors: Yuusuke Shinmen, Tokyo (JP); Norifumi Hirota, Tokyo (JP); Takeshi Nii, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 13/879,278

(22) PCT Filed: Oct. 13, 2011

(86) PCT No.: PCT/JP2011/073578
§ 371 (c)(1),
(2), (4) Date: Jul. 15, 2013

(87) PCT Pub. No.: WO2012/050171
PCT Pub. Date: Apr. 19, 2012

(65) Prior Publication Data
US 2013/0295811 A1     Nov. 7, 2013

(30) Foreign Application Priority Data

Oct. 13, 2010  (JP) .................................. 2010-230492
Jul. 27, 2011   (JP) .................................. 2011-164596
(Continued)

(51) Int. Cl.
*D01F 9/12*     (2006.01)
*B32B 37/14*    (2006.01)
(Continued)

(52) U.S. Cl.
CPC ............... *D01F 9/12* (2013.01); *B29C 70/44* (2013.01); *B32B 37/14* (2013.01); *C08J 5/042* (2013.01);
(Continued)

(58) Field of Classification Search
CPC ... D01F 6/18; D01F 6/38; D01F 9/225; D01F 9/12; D01F 9/22; D01D 5/253;
(Continued)

(56) References Cited

U.S. PATENT DOCUMENTS 3,923,950 A      12/1975   Gump et al.
4,024,227 A  *    5/1977   Kishimoto ................ D01F 9/22
                                                    264/29.2
(Continued)

FOREIGN PATENT DOCUMENTS

CN        1271396 A      10/2000
EP       0 416 789 A2     3/1991
(Continued)

OTHER PUBLICATIONS

JP2008-202207 (translated) Kawakami et al., Sep. 8, 2008.*
(Continued)

*Primary Examiner* — Camie S Thompson
(74) *Attorney, Agent, or Firm* — Oblon, McClelland, Maier & Neustadt, L.L.P.

(57) ABSTRACT

A carbon-fiber-precursor acryl fiber bundle, including a polyacrylonitrile-based copolymer that contains from 95 to 99 mol % of an acrylonitrile unit and from 1 to 5 mol % of a hydroxyalkyl (meth)acrylate unit, where the fiber bundle has a single-fiber fineness of from 1.5 dtex to 5.0 dtex and a roundness of from 0.75 to 0.9 in a cross-section shape perpendicular to a fiber axis of the single fiber; the roundness being determined with equation (1): roundness=$4\pi S/L^2$, where S is a cross-sectional area of the single fiber and L is a circumferential length of the single fiber, and S and L are obtained by observing, under an SEM, the cross-section of the single fiber perpendicular to the fiber axis of the single fiber and analyzing the obtained image.

11 Claims, 6 Drawing Sheets

(30) Foreign Application Priority Data

| | | | |
|---|---|---|---|
| Jul. 27, 2011 | (JP) | ................................ | 2011-164597 |
| Aug. 26, 2011 | (JP) | ................................ | 2011-184328 |
| Aug. 30, 2011 | (JP) | ................................ | 2011-186859 |

(51) Int. Cl.

| | |
|---|---|
| *F27D 7/00* | (2006.01) |
| *D01D 5/253* | (2006.01) |
| *D01F 6/38* | (2006.01) |
| *D01F 9/22* | (2006.01) |
| *C08J 5/04* | (2006.01) |
| *D01D 5/096* | (2006.01) |
| *C08J 5/24* | (2006.01) |
| *B29C 70/44* | (2006.01) |

(52) U.S. Cl.
CPC ............... *C08J 5/24* (2013.01); *D01D 5/096* (2013.01); *D01D 5/253* (2013.01); *D01F 6/38* (2013.01); *D01F 9/225* (2013.01); *F27D 7/00* (2013.01); *C08J 2363/00* (2013.01); *Y10T 428/26* (2015.01); *Y10T 428/298* (2015.01); *Y10T 442/3089* (2015.04)

(58) Field of Classification Search
CPC ......... Y10T 442/3089; Y10T 428/2918; C08F 220/44; C08F 220/06; C08F 220/18; C08J 5/042; C08J 5/24
USPC ................ 428/357, 364, 370, 397, 399, 401
See application file for complete search history.

(56) References Cited

U.S. PATENT DOCUMENTS

| | | | |
|---|---|---|---|
| 4,628,001 A | | 12/1986 | Sasaki et al. |
| 6,066,687 A | * | 5/2000 | Capone et al. ................. 524/94 |
| 6,114,034 A | * | 9/2000 | Jorkasky, II .............. D01F 6/18 428/359 |
| 6,635,199 B2 | | 10/2003 | Yamanaka et al. |

FOREIGN PATENT DOCUMENTS

| | | | |
|---|---|---|---|
| EP | 0 416 789 A3 | | 3/1991 |
| JP | 50-145620 A | | 11/1975 |
| JP | 61 11323 | | 4/1986 |
| JP | 1 132832 | | 5/1989 |
| JP | 1 161040 | | 6/1989 |
| JP | 2 6625 | | 1/1990 |
| JP | 2 84505 | | 3/1990 |
| JP | 2 169658 | | 6/1990 |
| JP | 4 281008 | | 10/1992 |
| JP | 6-146120 A | | 5/1994 |
| JP | 2535448 | | 9/1996 |
| JP | 2000 119341 | | 4/2000 |
| JP | 2001-279566 | * | 10/2001 |
| JP | 2002 61035 | | 2/2002 |
| JP | 2002 242027 | | 8/2002 |
| JP | 2002-266173 | * | 9/2002 |
| JP | 2002 266173 | | 9/2002 |
| JP | 2005 226193 | | 8/2005 |
| JP | 2006 257580 | | 9/2006 |
| JP | 2007 204880 | | 8/2007 |
| JP | 2008 202207 | | 9/2008 |
| JP | 2010-159533 A | | 7/2010 |
| JP | 2011-046942 | * | 3/2011 |
| JP | 2011 46942 | | 3/2011 |
| WO | WO 2007/069511 A1 | | 6/2007 |
| WO | WO 2010/002004 A1 | | 1/2010 |

OTHER PUBLICATIONS

Combined Chinese Office Action and Search Report dated Mar. 5, 2014 in Patent Application No. 201180049339.5 (with English translation of categories of cited documents).
Extended European Search Report dated Jun. 10, 2014 in Patent Application No. 11832602.4.
Zhiwei XU, et al., "Effect of kidney-type and circular cross sections on carbon fiber surface and composite interface", Composites: Part A: applied science and manufacturing, vol. 39, No. 2, XP022451164, (2008), pp. 301-307.
International Search Report dated Nov. 15, 2011 in PCT/JP11/73578 Filed Oct. 13, 2011.

* cited by examiner

CARBON-FIBER-PRECURSOR FIBER BUNDLE, CARBON FIBER BUNDLE, AND USES THEREOF

TECHNICAL FIELD

The present invention relates to a carbon-fiber-precursor fiber bundle, a method for flame proof treatment, a carbon fiber bundle and a method of producing the carbon fiber bundle. The present invention also relates to a carbon fiber prepreg, and particularly relates to a carbon fiber prepreg having a handling property and intensity reappearance suitable for moldings in large size. Further, the present invention relates to a method of molding a fiber reinforced fabric and a fiber reinforced plastic.

BACKGROUND ART

When it is attempted to improve productivity by increasing a total fineness of a carbon fiber bundle for the purpose of reducing production cost of a carbon fiber, there are many problems in terms of practical use and production technology and the cost was not reduced sufficiently.

In order to solve these problems, Patent Document 1 has proposed the technology in which a scorch upon a flame proof treatment is reduced using a carbon-fiber-precursor fiber bundle having a high roundness and further a large single-fiber fineness and a carbon fiber bundle which contains few interlaced single fibers, has excellent spreadability and productivity despite of large total fineness is obtained.

Patent Document 2 has proposed a polymer which does not require the flame-proof treatment. Further, Patent Documents 3, 4 and 9 have proposed the technology to enhance oxygen permeability of the carbon-fiber precursor fiber to control an oxygen concentration in a flame-proof fiber evenly and enhance tensile strength and tensile elastic modulus of obtained carbon fiber by using a monomer having a bulky side chain as a copolymerizable component of a copolymer.

Further, Patent Document 5 has proposed the technology to reduce thermal storage inside the fiber bundle by progressing the flame-proof while heated air is penetrated inside the fiber bundle on a mesh-shaped roller for PAN-based carbon-fiber-precursor fiber bundles.

Patent Document 6 has proposed the technology in which by measuring an isothermal exothermic curve of the carbon-fiber-precursor fiber bundle using a heat flow type differential scanning calorimeter, a content of a carboxylic group-containing vinyl monomer is optimized, a cross-section double structure after the flame-proof treatment is reduced even when burning at high speed is performed, and the productivity and the elastic modulus of the carbon fiber bundle can be balanced. Patent Document 7 has proposed the technology to produce the carbon fiber bundle with high performance by copolymerizing acrylamide to obtain a highly hydrophilic polyacrylonitrile copolymer.

Stabilization of the fiber in each step is also very important for reducing the production cost of the carbon fiber. For example, gelation of a spinning neat solution in a spinning step sometimes leads to a step trouble, and it is required to enhance thermal stability of the spinning neat solution. In Patent Document 8, the thermal stability when the spinning neat solution is kept at high temperature of about 80° C. is exponentially enhanced by esterifying methacrylic acid that is an accelerating component of the flame-proof reaction of the polymer.

A technique using a prepreg obtained by impregnating a fiber for reinforcement with a matrix resin composed mainly of a thermosetting resin is available as one of methods of molding fiber-reinforced composite materials, and such a composite material is used for a wide range of uses from sport/leisure-related uses to uses for aircrafts. The fiber-reinforced composite material using an intermediate base material composed of the prepreg is formed by laminating the prepreg followed by heating or heating/pressurizing to cure the thermosetting resin that is the matrix resin.

The technique using the prepreg is more excellent in fiber strength utilization than VARTM method. When the molding in large size is formed, generally it is desirable that the matrix resin be high flow. The matrix resin with low flow causes an occurrence of voids. However, when the matrix resin is high flow, micro ondulation of the fiber occurs and mechanical physical property of the molding in large size is reduced. The mechanical physical property in the molding in large size largely depends on its thickness, and when the thickness of the molding is increased, compression strength is reduced. Patent Documents 10 and 11 have proposed to prevent the reduction of various physical properties by making the matrix resin low flow.

When the fiber-reinforced fabric is used as a fiber base material, a resin film in which a resin was applied onto a film is attached to the fiber-reinforced fabric to make a prepreg, which is laminated in several layers, and the layers are heated and pressurized in an autoclave formation. In that case, the entire fabric is impregnated sufficiently with the resin and a good molding is obtained. The impregnation with the resin is also very good regardless of structure and fiber cross-sectional shape of the fiber-reinforced fabric. However, in RTM molding and vacuum bag formation, the resin is injected into the fiber base material, and thus, the resin having good fluidity and so-called a low viscosity resin is generally used as the resin. Thus, comparing with the conventional autoclave formation, the cost of forming the fiber base material having a larger weight per unit area is described to be advantageous, but the impregnation with the resin is largely influenced by the viscosity of the resin, the weight per unit area of the fiber fabric, inter-fiber voids, a single-fiber diameter, and the like, which was problematic.

Patent Document 12 has proposed the carbon fiber bundle having a ratio of a major axis and a minor axis (major axis/minor axis) of 1.05 to 1.6 in a fiber cross-section of a single-fiber in the carbon fiber bundles composed of a single-fiber of multiple carbon fibers as the carbon fiber bundle that simultaneously satisfies bundle integrity, the impregnation with the resin and cloth quality of obtained cloth and has the high strength.

Patent Document 1: Japanese Unexamined Patent Application, Publication No. 2008-202207
Patent Document 2: Japanese Unexamined Patent Application, Publication No. H01-132832
Patent Document 3: Japanese Unexamined Patent Application, Publication No. H02-84505
Patent Document 4: Japanese Unexamined Patent Application, Publication No. 2006-257580
Patent Document 5: Japanese Unexamined Patent Application, Publication No. H02-6625
Patent Document 6: Japanese Unexamined Patent Application, Publication No. 2000-119341
Patent Document 7: Japanese Unexamined Patent Application, Publication No. H04-281008
Patent Document 8: Japanese Unexamined Patent Application, Publication No. 2007-204880

Patent Document 9: Japanese Unexamined Patent Application, Publication No. H02-84505
Patent Document 10: Japanese Unexamined Patent Application, Publication No. H01-161040
Patent Document 11: Japanese Unexamined Patent Application, Publication No. H02-169658
Patent Document 12: Japanese Unexamined Patent Application, Publication No. 2002-242027

DISCLOSURE OF THE INVENTION

Problems to be Solved by the Invention

However, the following drawbacks are found in the inventions described in the above Patent Documents. In the technology in Patent Document 1, although the flame-proof step itself is shortened, the step of performing the flame-proof treatment to the polymer is required. Thus, the entire process of producing the carbon fiber is not shortened. The strength of the carbon fiber in Patent Document 2 is much lower than that of those using PAN and pitch as the raw material, and is not capable of responding to the request from the market.

In the technology of Patent Documents 3, 4 and 10, although the oxygen permeability inside the fiber is improved, shortening of the flame-proof step did not lead to cost saving. When the copolymerizable component is a methacrylate ester-based monomer having a bulky alkyl group, there was the problem in that the precursor fiber bundle could not keep compactness and homogeneity enough to assure the performance reappearance of the carbon fiber.

In the technology of Patent Document 5, there were the problems in that it became difficult to penetrate the heated air in the thick carbon-fiber-precursor fiber bundle and in that when a discharge pressure of the heated air was increased, interlace occurred inside the fiber bundle and spreadability of the fiber bundle when the prepreg is produced was reduced.

In the technology of Patent Documents 6 and 7, the cross-section double structure of the flame-proof fiber can be reduced even at high speed burning in the carbon-fiber-precursor fiber bundle having a small single-fiber fineness of about 1.2 dtex. However, the cross-section double structure cannot be reduced sometimes in the carbon-fiber-precursor fiber bundle having the large single-fiber fineness of about 2.5 dtex.

In the technology of Patent Document 8, although the thermal stability of the spinning neat solution was exponentially enhanced, the cross-section double structure tended to be accelerated when the flame-proof treatment was performed in a period in which the productivity of the carbon-fiber-precursor fiber bundle having the large single-fiber fineness was not impaired.

In the technology of Patents 10 and 11, by making the matrix resin low flow, it is possible to prevent the occurrence of micro ondulation of the fiber and the reduction of the mechanical physical property due to it, but when this technology is applied to the formation of the molding in large size, there is the problem in that the defects such as voids occur.

Patent Document 12 has provided the carbon fiber bundle excellent in impregnation with the resin by the carbon fiber bundle of small number of threads that are 3,000, but the total fineness of the carbon fiber bundle is small and thus it is very difficult to save the cost.

It is an object of the present invention to provide a carbon fiber bundle which has a large value of single-fiber fineness and excellent productivity and which, despite this, contains few interlaced single fibers therein and has excellent spreadability, and a carbon-fiber precursor fiber suitable for the production thereof.

It is another object of the present invention to provide a carbon-fiber-precursor acryl fiber bundle that can efficiently produce a high quality carbon fiber bundle in which a cross-section double structure of a flame-proofed fiber is reduced in high speed burning even when a single-fiber fineness is large, and a method of producing a flame-proofed fiber bundle using the precursor acryl fiber bundle.

It is another object of the present invention to provide a carbon-fiber-precursor acryl fiber bundle capable of providing a high quality carbon fiber bundle by performing an economical flame-proof heat treatment even when a single-fiber fineness is large, and a flame-proofed fiber using the precursor acryl fiber bundle, and a method of producing a carbon fiber bundle using the precursor acryl fiber bundle.

It is another object of the present invention to provide a carbon fiber prepreg in which reduction of compression strength is small even when a thickness of the molding after its formation is increased while high flow of a matrix resin is kept.

It is another object of the present invention to provide a carbon fiber bundle, a fiber-reinforced fabric and a method of forming a fiber-reinforced plastic, which have high strand tensile strength and impregnation even when a diameter of a single fiber is large.

Means for Solving the Problems

The above problems are solved by the present invention composed of the following technical procedures [1] to [35].

[1] A carbon-fiber-precursor acryl fiber bundle composed of a polyacrylonitrile-based copolymer containing 95 to 99 mol % of an acrylonitrile unit and 1 to 5 mol % of a hydroxyalkyl (meth)acrylate unit, having a single-fiber fineness of 1.5 dtex or more and 5.0 dtex or less and having a roundness of 0.9 or less in a cross-section shape perpendicular to a fiber axis of the single fiber:

wherein, the roundness is a value determined using a following equation (1), where S and L are a cross-sectional area and a circumferential length, respectively, of the single fiber, which are obtained by observing, under an SEM, the cross-section of the single fiber perpendicular to the fiber axis of the single fiber and analyzing the obtained image:

$$\text{Roundness} = 4\pi S/L^2 \tag{1}$$

[2] The carbon-fiber-precursor acryl fiber bundle according to [1] above, wherein the single-fiber fineness is 1.5 dtex or more and 3.0 dtex or less.

[3] The carbon-fiber-precursor acryl fiber bundle according to [1] or [2] above, wherein the roundness is 0.7 or more in the cross-sectional shape perpendicular to the fiber axis of the single fiber.

[4] The carbon-fiber-precursor acryl fiber bundle according to [1] or [2] above, wherein a melting point under heat and humidity of the polyacrylonitrile-based copolymer is 160 to 175° C.

[5] A carbon-fiber-precursor acryl fiber bundle, wherein a constant velocity temperature rising exothermic curve at 30° C. or above and 450° C. or below measured at a temperature rising rate of 10° C./minute in air flow at 100 ml/minute at 30° C. and 0.10 MPa using a heat flux type differential scanning calorimeter satisfies the following condition:

a heat quantity Ja obtained by integrating an exothermic velocity at 230° C. or above and 260° C. or below of the constant velocity temperature rising exothermic curve is 100 kJ/kg or more and 250 kJ/kg or less; and heat quantity Jb obtained by integrating an exothermic velocity at 260° C. or above and 290° C. or below is 550 kJ/kg or more and 1050 kJ/kg or less.

[6] The carbon-fiber-precursor acryl fiber bundle according to [5] above, composed of a polyacrylonitrile-based copolymer composed of 95.0 mol % or more and 99.0 mol % or less of an acrylonitrile unit and 1.0 mol % or more and 5.0 mol % or less of a hydroxyalkyl (meth)acrylate unit.

[7] The carbon-fiber-precursor acryl fiber bundle according to [6] above, wherein a single-fiber fineness is 1.5 dtex or more and 5.0 dtex or less.

[8] The carbon-fiber-precursor acryl fiber bundle according to [6] above, wherein a water contact angle is 40° or more and 70° or less.

[9] The carbon-fiber-precursor acryl fiber bundle according to any of [5] to [8] above, wherein the heat quantity Ja is 160 kJ/kg or less.

[10] The carbon-fiber-precursor acryl fiber bundle according to any of [6] to [8] above, wherein an oxidation depth De obtained by a following method is 4.0 μm or more and 6.0 μm or less in the polyacrylonitrile-based copolymer:

1) the polyacrylonitrile-based copolymer is dissolved at a concentration of 25% by mass in dimethylformamide to prepare a copolymer solution;

2) the copolymer solution is applied onto a glass plate;

3) the glass plate on which the copolymer solution was applied is dried in air at 120° C. for 6 hours to evaporate dimethylformamide and make a film having a constant thickness in the range of 20 μm or more and 40 μm or less;

4) a flame-proof treatment is performed by treating the obtained film with heat in air at 240° C. for 60 minutes and further in air at 250° C. for 60 minutes to obtain a flame-proofed film;

5) the obtained flame-proofed film is embedded in a resin followed by being polished, and a cross-section perpendicular to a surface of the polished flame-proofed film is observed at a magnification of 1500 using a fluorescence microscope; and 6) An oxidation progressing part is observed as a relatively dark layer and an oxidation non-progressing part is observed as a relatively light layer in the cross-section, thus a distance from the surface of the polished flame-proofed film to a boundary between the dark layer and the light layer is measured at least at 5 points on one cross-section. The same measurement is further repeated on three cross-sections. Their arithmetic average is used as the oxidation depth De (μm).

[11] A carbon-fiber-precursor acryl fiber bundle satisfying the following conditions:

1) the single-fiber fineness is 2.0 dtex or more and 5.0 dtex or less;

2) a calorific value per unit mass at 215 to 300° C. obtained by the measurement using a heat flux type differential scanning calorimeter is 3200 kJ/kg or more (wherein, a temperature rising rate in the measurement using the heat flux type differential scanning calorimeter is 2° C./minute and an atmosphere is air); and 3) a half-value width of solid $^1$H-NMR spectra (measurement temperature 160° C.) is 10.0 kHz or more and 14.5 kHz or less.

[12] The carbon-fiber-precursor acryl fiber bundle according to [11] above, composed of a polyacrylonitrile-based copolymer composed of 95.0 mol % or more and 99.0 mol % or less of an acrylonitrile unit and 1.0 mol % or more and 5.0 mol % or less of a hydroxyalkyl (meth)acrylate unit.

[13] The carbon-fiber-precursor acryl fiber bundle according to [12] above, wherein a calorific value at 215 to 300° C. obtained by the measurement using a heat flux type differential scanning calorimeter is 3300 kJ/kg or more.

[14] The carbon-fiber-precursor acryl fiber bundle according to [12] above, wherein a half-value width of solid $^1$H-NMR spectra (measurement temperature 160° C.) is 10.0 kHz or more and 13.5 kHz or less.

[15] A method for flame-proof treatment, wherein the flame-proof treatment is performed to the carbon-fiber-precursor acryl fiber bundle according to any of [1], [2], [5] to [8] and [11] to [14] above under an oxidation atmosphere at temperature of 220° C. or above and 300° C. or below for 30 minutes or more and 90 minutes or less to obtain a flame-proofed fiber bundle having a fiber density of 1.35 g/cm$^3$ or more and 1.43 g/cm$^3$ or less.

[16] A method of producing a carbon fiber bundle wherein a diameter Di is 8 μm or more and a roundness of a shape is 0.90 or less in a cross-section perpendicular to a fiber axis of a single fiber, wherein a flame-proof treatment is performed to the carbon-fiber-precursor acryl fiber bundle according to any of [1], [2], [5] to [8] and [11] to [14] above under an oxidation atmosphere at temperature of 220° C. or above and 300° C. or below for 30 minutes or more and 90 minutes or less to obtain a flame-proofed fiber bundle having a fiber density of 1.35 g/cm$^3$ or more and 1.43 g/cm$^3$ or less, and wherein the flame-proofed fiber bundle is further carbonized at temperature of 800° C. or above and 2000° C. or below in an inert gas:

wherein, the diameter Di is obtained by the following method:

1) preparation of sample, wherein a carbon fiber bundle cut into a length of 5 cm is embedded in an epoxy resin (Epomount base: Epomount curing agent=100:9 (mass ratio)), and cut into a length of 2 cm to expose a cross-sectional surface, to which a mirror surface treatment is performed;

2) etching treatment of surface to be observed, wherein further in order to clarify a contour of the fiber, an etching treatment is performed to the cross-sectional surface of the sample by the following method:

Apparatus used: Plasma Etching Apparatus JP-170 manufactured by JEOL Ltd.;

treatment condition: (Atmosphere gas: Ar/O$_2$=75/25, plasma output power: 50 W, vacuum degree: about 120 Pa, treatment time period: 5 minutes);

3) observation under SEM, wherein the cross-sectional surface of the samples obtained by 1) and 2) above is observed using SEM (PHILIPS FEI-XL20), and five photographs of 5 or more fiber cross-sections on an image are taken randomly; and 4) Measurement of diameter of single fiber cross-section in carbon fiber bundle, wherein for each sample, 20 single fiber cross-sections from the 5 SEM photographs, wherein 3 or more single fiber cross-sections from one photograph, are randomly selected, the contour of the fiber cross-section is traced using image analysis software (product name: Image-ProPLUS manufactured by Nippon Roper K.K.), a major axis (maximum feret diameter) d of the cross-section is measured, and a mean value of the major axes of all single fiber cross-sections selected is used as the diameter Di of the single fiber in the carbon fiber bundle.

[17] A carbon fiber bundle produced by the method according to [16] above, wherein an average single-fiber fineness is 1.0 to 2.4 dtex and a roundness is 0.7 or more and 0.9 or less in a shape of a cross-section perpendicular to a fiber axis of a single fiber.

[18] The carbon fiber bundle according to [17] above, wherein a diameter Di of the cross-section perpendicular to the fiber axis of the single fiber is 8 to 20 µm.

[19] The carbon fiber bundle according to [17] above, having a plurality of groove-shaped concavo-convex structures extending in a lengthwise direction of the single fiber on the surface of the single fiber and a difference in height between a highest part and a lowest part in a range of a circumference length of 2 µm of the single fiber is 80 nm or less.

[20] The carbon fiber bundle according to any of [17] to [19] above, wherein a strand tensile strength is 4000 MPa or more.

[21] The carbon fiber bundle according to any of [17] to [19] above, wherein a strand tensile elastic modulus is 200 GPa or more.

[22] The carbon fiber bundle according to any of [17] to [19] above, wherein a total fineness is 30000 to 90000 dtex.

[23] A carbon fiber prepreg composed of a matrix resin and a carbon fiber bundle having a single-fiber fineness of 1.2 to 2.4 dtex and a roundness of 0.7 or more and 0.9 or less in a cross-section perpendicular to a fiber axis of a single fiber.

[24] The carbon fiber prepreg according to [23] above, wherein the carbon fiber bundle is a PAN-based carbon fiber bundle.

[25] The carbon fiber prepreg according to [23] or [24] above, wherein a diameter Di perpendicular to the fiber axis of the single fiber in the carbon fiber bundle is 8 to 20 µm.

[26] The carbon fiber prepreg according to any of [23] to [25] above, wherein a flow index of the matrix resin is 5000 $Pa^{-1}$ or more.

[27] The carbon fiber prepreg according to any of [23] to [26] above, wherein the matrix resin is an epoxy resin.

[28] The carbon fiber prepreg according to [27] above, wherein the epoxy resin comprises an epoxy resin having an oxazolidone ring structure.

[29] The carbon fiber prepreg according to [27] or [28] above, wherein the epoxy resin comprises a thermoplastic resin.

[30] The carbon fiber prepreg according to any of [27] to [29] above, wherein the epoxy resin comprises dicyandiamide as a curing agent.

[31] The carbon fiber prepreg according to [27] or [30] above, wherein the epoxy resin comprises a urea compound as a curing aid.

[32] A unidirectional fiber-reinforced fabric, wherein the carbon fiber bundle according to any of [17] to [19] above is arranged in a longitudinal direction.

[33] The fiber-reinforced fabric according to [32] above, which is a unidirectional fabric wherein the unidirectional fiber-reinforced fabric has an assistant thread in a transverse direction and the assistant thread is tangled with the carbon fiber bundle in the longitudinal direction.

[34] The fiber-reinforced fabric according to [33] above, wherein the assistant thread comprises a low melting point polymer and is adhered to the carbon fiber bundle in their intersection point through the polymer.

[35] A method of forming a fiber-reinforced plastic, wherein the fiber-reinforced fabric according to any of [32] to [34], wherein the number of filaments that compose the carbon fiber bundle is 15000 to 100000 or a total fineness of the carbon fiber bundle is 9900 to 65000 dtex, is laminated as a fiber base material in at least one or more layers on a forming die, a medium for diffusing a resin in a surface direction is placed thereon, subsequently the fiber base material and the medium are entirely covered with a bag film, then an inside of the bag film is vacuumized to diffuse a room temperature curable resin on one side of the fiber base material and impregnate the fiber base material therewith.

According to the present invention, the carbon fiber bundle which has a large value of single-fiber fineness and excellent productivity and which, despite this, contains few interlaced single fibers therein and has excellent spreadability, and the carbon-fiber-precursor fiber suitable for the production thereof are provided.

According to the present invention, the carbon-fiber-precursor acryl fiber bundle that can efficiently produce a high quality carbon fiber bundle in which the cross-section double structure of the flame-proof fiber is reduced in high speed burning even when the single fiber fineness is large, and the method of producing the flame-proof fiber bundle using the precursor acryl fiber bundle are provided.

According to the present invention, the carbon fiber bundle having the large single fiber fineness and proper physical properties is provided.

According to the present invention, the molding wherein the reduction of the compression strength of the molding is small due to increase of the thickness of the molding and the compression strength of the molding less depends on the thickness while the high flow of the matrix resin is kept is provided.

According to the present invention, it is possible to obtain the carbon fiber bundle, the fiber-reinforced fabric and the fiber-reinforced plastic, which are excellent in impregnation and have a large tow volume. Thus, processing becomes easy in the uses for the prepreg and the fabrics that are main uses of the carbon fiber. It is also possible to produce the carbon fiber composite material having the larger single-fiber fineness, the higher tensile strength and more excellent intensity reappearance than the conventional carbon fibers.

PREFERRED MODE FOR CARRYING OUT THE INVENTION

Polyacrylonitrile-Based Copolymer

Figure 1:
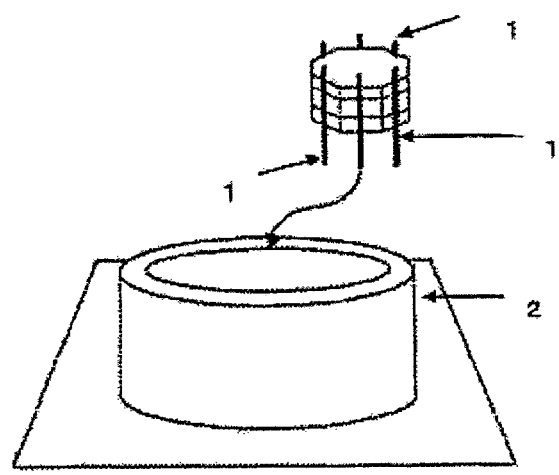
FIG. 1 is a schematic diagram illustrating a step of curing a carbon fiber bundle with a methacryl resin.
Figure 2:
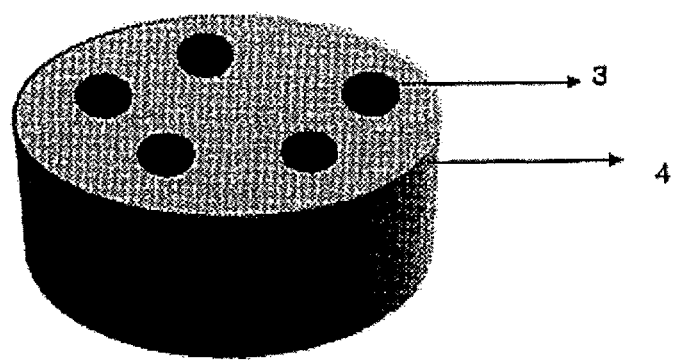
FIG. 2 is a cross-sectional view illustrating a carbon fiber bundle (sample) embedded in the methacryl resin.

A content of an acrylonitrile unit in a polyacrylonitrile-based copolymer (hereinafter sometimes referred to as a "copolymer") that composes the carbon-fiber-precursor acryl fiber bundle (hereinafter sometimes referred to as a "precursor fiber bundle) of the present invention is 95 to 99 mol %. When the content is 95 mol % or more, the reduction of a copolymerization rate of the acrylonitrile unit does not lead to the reduction of performance of the carbon fiber. On the other hand, an upper limit of 99 mol % is defined from a required amount of a copolymerization component.

A content of a hydroxyalkyl (meth)acrylate unit in the copolymer is 1 to 5 mol %. A carboxylate ester group in the hydroxyalkyl (meth)acrylate unit is pyrolyzed at high temperature of 240° C. or above to become a carboxylate group. When the content of the hydroxyalkyl (meth)acrylate unit in the copolymer is 1 mol % or more, a sufficient effect to promote a flame-proof reaction is obtained when the carboxylate ester group in the hydroxyalkyl (meth)acrylate unit becomes the carboxylate group in the flame-proof reaction. On the other hand, when the content is 5 mol % or less, a runaway of the flame-proof reaction can be inhibited. Further, it is possible to inhibit the reduction of a carbonization yield with dissociation of a hydroxyalkyl group in the flame-proof reaction.

A lower limit of the content of the hydroxyalkyl (meth) acrylate unit is preferably 1.2 mol % or more in terms of assuring compactness of the precursor fiber bundle and is more preferably 1.5 mol % or more in that the carbon fiber with higher performance can be obtained. The upper limit of the content of the hydroxyalkyl (meth)acrylate unit is preferably 4.0 mol % or less in that the runaway of the flame-proof reaction is inhibited and is more preferably 3.0 mol % or less in that the reduction of the carbonization yield is inhibited.

Hydroxyalkyl (meth)acrylate that is a raw material of the hydroxyalkyl (meth)acrylate unit includes 2-hydroxyethyl (meth)acrylate, 2-hydroxypropyl (meth)acrylate, 4-hydroxybutyl (meth)acrylate, monoglyceryl (meth)acrylate, and the like. Further, these monomers may be used in combination of two or more. When the monomers are combined, if a total amount of the monomers is 5.0 mol % or less, their ratio can be determined freely.

2-Hydroxyethyl (meth)acrylate is suitable as a component of the copolymer of the present invention because dissociation temperature of a hydroxyethyl group in the flame-proof reaction is 240° C. or above, its bulkiness is enough to enhance the oxygen permeability, the mass is less reduced when the hydroxyethyl group is dissociated and 2-Hydroxyethyl (meth)acrylate is easily industrially available.

Other Monomers

The copolymer of the present invention contains the acrylonitrile unit and the hydroxyalkyl (meth)acrylate unit, but may contain the "other monomer unit" if necessary.

Vinyl-based monomers copolymerizable with acrylonitrile are preferable as the "other monomer" that is the raw material of the other monomer unit. Specifically, the other monomer includes (meth)acrylate esters such as methyl (meth)acrylate, ethyl (meth)acrylate, propyl (meth)acrylate, butyl (meth)acrylate and hexyl (meth)acrylate, halogenated vinyls such as vinyl chloride, vinyl bromide and vinylidene chloride, acids such as (meth)acrylic acid, itaconic acid and crotonic acid and salts thereof, maleic imide, phenyl maleimide, (meth)acrylamide, styrene, α-methylstyrene, vinyl acetate, and the like. These may be used alone or in combination of two or more.

The content of the other monomer in the copolymer of the present invention is preferably 3.5 mol % or less in consideration of the contents of the acrylonitrile unit and the hydroxyalkyl (meth)acrylate unit.

Melting Point Under Heat and Humidity

A melting point under heat and humidity of the copolymer of the present invention is preferably 160 to 175° C. When the melting point under heat and humidity is 160° C. or above, adherence between the single fibers in the precursor fiber bundle can be inhibited and the reduction of quality and dynamic physical properties of the obtained carbon fiber bundle can be inhibited. If the melting point under heat and humidity is 175° C. or below, for example, when a dry compacted thread during a spinning step is stretched with steam, the higher steam, i.e., higher pressure steam becomes unnecessary, thus feathering and scratch that occur due to up and down movement of the precursor fiber bundle under the high pressure steam can be reduced. Thus, the reduction of the quality and the dynamic physical properties of the obtained carbon fiber bundle can be inhibited.

Water Contact Angle of Copolymer

A water contact angle of the copolymer of the present invention is preferably 40° or more and 70° or less. When the contact angle of the copolymer with water is 70° or less, an organic solvent and a coagulation bath solution are exchanged mildly in a spinning neat solution in a spinning step, particularly in a coagulation step when the precursor fiber bundle is formed from the copolymer, and thus the compactness of the precursor fiber bundle is enhanced easily. Also, when the contact angle of the copolymer with water is 40° or more, hydrophilicity of the copolymer is kept properly, and the coagulation can be performed efficiently without causing agglutination between adjacent fibers in the spinning step, particularly in the coagulation step. From these viewpoints, the contact angle of the copolymer with the water is preferably 55° or more and 65° or less and more preferably 58° or more and 62° or less.

Oxidation Depth De of Copolymer Upon Flame-Proof Treatment

An oxidation depth De upon the flame-proof treatment of a film obtained from the copolymer of the present invention is an indicator of a flame-proof reactivity of the precursor fiber bundle obtained from the copolymer of the present invention in a burning step, particularly a flame-proof step. That is, the larger the oxidation depth De is, the oxygen is sufficiently diffused inside the single fiber of the precursor fiber bundle and the flame-proof treatment can be evenly performed. Therefore, the oxidation depth De is preferably 4.0 µm or more and 6.0 µm or less in terms of oxidation reaction in the flame-proof reaction.

When the oxidation depth De is 4.0 µm or more, the oxygen can be distributed easily inside the fiber in the flame-proof step in the carbon-fiber-precursor acryl fiber bundle having the large single-fiber fineness of 2.0 dtex or more and 5.0 dtex or less, high oxygen diffusibility is obtained and the carbon fiber with the high performance is easily obtained. On the other hand, when the oxidation depth is 6.0 µm or less, the progress of the oxidation reaction in the flame-proof treatment can be easily controlled in an appropriate range, and the yield of the obtained carbon fiber is less reduced. From these viewpoints, the oxidation depth De is more preferably 4.4 to 5.8 µm, and still more preferably 4.6 to 5.6 µm. A method of measuring the oxidation depth De will be described later.

Method of Producing Copolymer

A polymerization initiator is not particularly limited, and azo-based compounds, organic peroxide, and redox catalysts such as ammonium salts of persulfuric acid/sulfurous acid and chloric acid/sulfurous acid can be used.

In the suspension polymerization, for example, each monomer, distilled water, ammonium persulfate, ammonium hydrogen sulfide and sulfuric acid are continuously supplied in constant amounts in an overflow type polymerization container. The mixture is stirred while the temperature is kept constant, and a polymer slurry that overflowed is washed and dried to obtain the copolymer.

Precursor Fiber Bundle

In the precursor fiber bundle of the present invention, the single-fiber fineness is 1.5 dtex or more and 5.0 dtex or less and the roundness is 0.90 or less in the shape of the cross-section perpendicular to the fiber axis of the single fiber. Hereinafter, the precursor fiber bundle is appropriately referred to as a "first group invention" in some cases.

Single-Fiber Fineness

When the single-fiber fineness of the precursor fiber bundle is 1.5 dtex or more, the single fibers are less in contact with one another inside the precursor fiber bundle. Therefore, the single fibers are less tangled with one another, and the spreadability of the carbon fiber bundle can be kept when the carbon fiber bundle is made. On the other hand, when the single fiber fineness of the precursor fiber bundle is 5.0 dtex or less, the cross-section double structure does not become prominent in the flame-proof step, and the carbon fiber bundle with uniform quality can be produced stably. The single-fiber fineness is more preferably 2.0 dtex or more and 2.5 dtex or less. The single-fiber fineness is preferably 4.5 dtex or less and more preferably 3.0 dtex or less.

Cross-Sectional Shape

The roundness is 0.90 or less in the cross-sectional shape of the single fiber in the precursor fiber bundle of the present invention. The cross-sectional shape is preferably a horse-bean shape. When the cross-sectional shape is the horse bean shape having the roundness of 0.90 or less, the flame-proof reaction progresses sufficiently without shortage of oxygen diffusion inside the single fiber that composes the precursor fiber bundle upon the flame-proof treatment. As a result, the feathering in the carbonization step is reduced, the fiber can pass the steps well, and the strength and the elastic modulus of the obtained carbon fiber bundle can be kept properly.

However, when the cross-sectional shape is changed excessively, a content rate of the fiber cannot be increased when the prepreg is produced from the obtained carbon fiber bundle, and the dynamic physical property of the composite material is reduced. Thus, the roundness of the single fiber that composes the carbon fiber bundle is preferably 0.70 or more, more preferably 0.75 or more and still more preferably 0.80 or more.

The cross-sectional shape of the single fiber in the precursor fiber bundle of the present invention having the above structure has a short distance from the inside to the surface of the fiber. Thus, even when the single-fiber fineness is increased to some extent, it is possible to evenly perform the flame-proof treatment, and the carbon fiber bundle with the high performance is obtained easily.

In the present invention, the roundness is a value determined using the following equation (1), where S and L are a cross-sectional area and a circumferential length, respectively, of the single fiber, which are obtained by observing, under an SEM, the cross-section of the single fiber perpendicular to the fiber axis of the single fiber and analyzing the obtained image.

$$\text{Roundness}=4\pi S/L^2 \quad (1)$$

Heat quantity Ja, Jb on constant velocity temperature rising exothermic curve

In the precursor fiber bundle of the present invention, a constant velocity temperature rising exothermic curve at 30° C. or above and 450° C. or below measured at a temperature rising rate of 10° C./minute in air flow at 100 ml/minute (standard: at 30° C. and 0.10 MPa) using a heat flux type differential scanning calorimeter satisfies the following conditions. Hereinafter, the precursor fiber bundle is referred to as a "second group invention" in some cases.

Conditions (1) A heat quantity Ja obtained by integrating an exothermic velocity at 230° C. or above and 260° C. or below of the constant velocity temperature rising exothermic curve is 100 kJ/kg or more and 250 kJ/kg or less; and (2) Heat quantity Jb obtained by integrating an exothermic velocity at 260° C. or above and 290° C. or below of the constant velocity temperature rising exothermic curve is 550 kJ/kg or more and 1050 kJ/kg or less.

The constant velocity temperature rising exothermic curve indicates the heat quantity generated when the flame-proof reaction progresses in the precursor fiber bundle.

When the carbon fiber bundle is produced, in the flame-proof step where the flame-proofed fiber bundle is obtained from the precursor fiber bundle, a treatment temperature in its early phase is set in the range of the temperature that is equal to or higher than the temperature at which the flame-proof reaction is initiated and that is equal to or lower than the temperature at which the precursor fiber bundle is not melted. Meanwhile, when the flame-proof reaction progresses to some extent, the treatment temperature can be raised in order to efficiently perform the flame-proof reaction. Generally, in order to perform the flame-proof treatment to the precursor fiber bundle at a temperature zone of 220 to 300° C., the present inventors divided this temperature zone into two zones that are a flame-proof step first half and a flame-proof step second half using 260° C. as a center, and made a calorific value at 230° C. or above and 260° C. or below a heat quantity Ja and a calorific value at 260° C. or above and 300° C. or below a heat quantity Jb, and compared the calorific value in each zone with the quality and the performance of the finally obtained carbon fiber bundle.

As a result, it was found that when the heat quantities Ja and Jb were in the above range, the flame-proof reaction and the oxygen diffusion were performed in good balance, the cross-section double structure of the flame-proofed fiber was inhibited in the flame-proof treatment at high speed, the carbon fiber bundle with high quality and good performance reappearance was obtained efficiently, and the flame-proof treatment could be evenly given to the precursor fiber bundle having the large single-fiber fineness. At that time, the temperature upon the flame-proof treatment was set to the range of 220° C. to 300° C., which was the optimal temperature for giving the flame-proof treatment to the precursor fiber bundle.

That is, when the heat quantity Ja is 100 kJ/kg or more, the flame-proof reaction progresses appropriately in the flame-proof step first half, and the precursor fiber bundle is easily passed through the step without being melted with heat. When the heat quantity Ja is 250 kJ/kg or less, the flame-proof treatment is easily given to the precursor fiber bundle having the large single-fiber fineness without progressing the flame-proof reaction at once in the flame-proof step first half. The heat quantity Ja is more preferably 120 kJ/kg or more in terms of enhancement of the productivity by shortening of flame-proof treatment time, and is more preferably 200 kJ/kg or less and particularly preferably 160 kJ/kg or less in that the flame-proof treatment is more evenly performed to the precursor fiber bundle having the large single-fiber fineness.

Meanwhile, when the heat quantity Jb is 550 kJ/kg or more, the flame-proof treatment is easily given to the precursor fiber bundle up to a target density of the flame-proofed fiber without impairing the productivity in the flame-proof step. When the heat quantity Jb is 1050 kJ/kg or less, the flame-proof reaction progresses mildly in the flame-proof step. Thus, the flame-proof treatment is easily and evenly given to the precursor fiber bundle having the single-fiber fineness, and the formation of the cross-section double structure is easily inhibited. The heat quantity Jb is preferably 600 kJ/kg or more in terms of enhancement of the productivity by shortening of flame-proof treatment time, and is more preferably 700 kJ/kg or more in terms of further enhancement of the productivity. The heat quantity Jb is preferably 950 kJ/kg or less in that the flame-proof treatment is more evenly given to the precursor fiber bundle having the large single-fiber fineness.

From the above, it was found that the heat quantity Ja could be made the indicator of the flame-proof reaction in the flame-proof step first half and the heat quantity Jb could be made the indicator of the flame-proof reaction in the flame-proof step second half. The heat quantity Ja and the heat quantity Jb can consistently be made the indicators of the flame-proof reactivity of the precursor fiber bundle. The temperature zone actually applied to the flame-proof step may or may not include the temperature zones of the heat quantity Ja and the heat quantity Jb (i.e., 230 to 260° C. and 260 to 290° C.), and can be appropriately controlled in the range of 220 to 300° C. depending on the precursor fiber bundle to be used.

Calorific Value and Half-Value Width of H-NMR Spectra

In the precursor fiber bundle of the present invention, the calorific value per unit mass at 215 to 300° C. measured using the heat flux type differential scanning calorimeter (hereinafter sometimes abbreviated as "DSC") is 3200 to 3800 kJ/kg, and the half-value width of the spectra observed at 160° C. in solid $^1$H-NMR is 10 kHz or more and 14.5 kHz or less. Hereinafter, the precursor fiber bundle is referred to as a "third group invention" in some cases.

A commercially available heat flux type differential scanning calorimeter can be used as the heat flux type differential scanning calorimeter.

But, the calorific value is a value obtained under the following measurement conditions.

Measurement atmosphere: air

Gas flow: 100 ml/minute

Temperature rising condition: 20° C./minute (room temperature to 210° C.), 2° C./minute (210 to 300° C.)

The calorific value is obtained by using a value of a heat flow quantity at 215° C. as 0 and integrating values of the heat flow quantity at 215 to 300° C. by time. The calorific value per unit mass is obtained by dividing the calorific value by a mass of the sample subjected to the measurement.

When the calorific value is 3200 kJ/kg or more, there are many structures stable for the heat after the flame-proof step, and the elastic modulus is not reduced when the carbon fiber is made. This calorific value is preferably 3300 kJ/kg or more.

The half-value width of the spectra observed at 160° C. in solid $^1$H-NMR is an indicator of molecular movement, where the smaller the value is, the better the molecular movement is. This value is almost the same when the composition of the polyacrylonitrile-based copolymer is the same.

When the molecular movement is good, the diffusibility of oxygen is good. When the half-value width of the spectra is 14.5 kHz or less, the diffusibility of the oxygen is good upon the flame-proof treatment, and the stable structure can be formed into the fiber bundle even when the single-fiber fineness of the precursor fiber bundle is large. Thus, the strand elastic modulus of the carbon fiber is not reduced and also the strand strength is not reduced. When the half-value width of the spectra is 10.0 kHz or more, the molecular movement is reduced and an orientation of the molecule is kept easily. The half-value width of the spectra is preferably 10.0 kHz or more and 13.5 kHz or less.

A commercially available apparatus can be used for solid $^1$H-NMR, and the half-value width of the spectra is a value obtained by measuring by a static probe in which a coil is secured perpendicularly to a magnetic field.

It is preferable that the precursor fiber bundle that is the "first group invention" further have the feature of the "second group invention" or the feature of the "third group invention".

Method of Producing Precursor Fiber Bundle

The precursor fiber bundle of the present invention can be produced, for example, by discharging a spinning neat solution containing a concentration of 15 to 30% by mass of a copolymer obtained by dissolving the aforementioned polyacrylonitrile-based copolymer in a solvent into a coagulation bath at a concentration of 30 to 70% by mass at temperature of 20 to 50° C. to obtain a coagulated thread and stretching this coagulated thread with heat and humidity to 2.5 times or more and 6 times or less. A spinning method is described below.

Preparation of Spinning Neat Solution

The aforementioned copolymer is dissolved in the solvent by the known method to use as a spinning neat solution. An organic solvent such as dimethylacetamide, dimethylsulfoxide and dimethylformamide, and an aqueous solution of an inorganic compound such as zinc chloride and sodium thiocyanate can be used as the solvent. The organic solvent is preferred because no metal is contained in the precursor fiber and the step is simplified, and of these, it is preferable to use dimethylacetamide because the compactness of the coagulated thread and a stretched thread with heat and humidity is high.

Coagulation

It is preferred that the spinning neat solution have the concentration of the copolymer to some extent or more so as to obtain compact coagulated threads and have the appropriate viscosity and fluidity. The concentration of the copolymer in the spinning neat solution is preferably in the range of 15 to 30% by mass and more preferably in the range of 18 to 25% by mass.

A known method can be employed as the spinning method, and specifically a wet spinning method, a dry wet spinning method, a dry spinning method and the like are included. Of these, the wet spinning method is preferably used in terms of productivity.

The coagulated thread is obtained by discharging the above spinning neat solution into the coagulation bath through a spinning nozzle. It is possible to control the roundness of the single fiber in the precursor fiber bundle in the coagulation step in the spinning step. The concentration is preferably 30% by mass or more and 60% by mass or less and the temperature is preferably 20° C. or above and 40° C. or below as a coagulation bath condition. When the coagulation bath condition is in this range, the precursor fiber bundle having the roundness of 0.75 or more and 0.90 or less can be obtained while the proper coagulation rate is kept.

When the coagulation bath concentration is 60% by mass or less, an exchange rate of the solvent and water on the surface of the spinning neat solution discharged into the coagulation bath is above a diffusion rate of the water into the spinning neat solution, the roundness of the precursor fiber bundle is kept in the above range as well as the compact precursor fiber can be obtained. Further, the adhesion between single threads in the precursor fiber bundle can be inhibited. In particular, when the precursor fiber bundle having both the large single-fiber fineness and the large total fineness is spun, the concentration is preferably 55% by mass or less in terms of further inhibiting the adhesion between the single threads. When the coagulation bath concentration is 30% by mass or more, the exchange rate of the solvent and water on the surface of the spinning neat solution discharged into the coagulation bath being prominently above the diffusion rate of the water into the spinning neat solution can be inhibited, the roundness of the precursor fiber bundle is kept in the above range in the range in which rapid shrinkage of the coagulated thread does not occur, and the compact precursor fiber can be obtained.

Meanwhile, when the coagulation bath temperature is 40° C. or below, the exchange rate of the solvent and water on the surface of the spinning neat solution discharged into the coagulation bath being prominently above the diffusion rate of the water into the spinning neat solution can be inhibited, the roundness of the precursor fiber bundle is kept in the above range in the range in which rapid shrinkage of the coagulated thread does not occur, and the compact precursor fiber can be obtained. Also when it is 20° C. or above, the exchange rate of the solvent and water on the surface of the spinning neat solution discharged into the coagulation bath and the diffusion rate of the water into the spinning neat solution are kept appropriately so that it becomes possible to stably produce the precursor fiber bundle. Further, it is not necessary to excessively cool the coagulation bath, capital investment and running cost can be reduced, and it becomes possible to produce the precursor fiber bundle with low cost.

When the compactness or the homogeneity of the fiber structure in the precursor fiber bundle is insufficient, a site of such a fiber structure becomes a defect point upon burning, and the performance of the carbon fiber is sometimes impaired. In order to obtain the compact and homogenous precursor fiber bundle, the characteristics of the coagulated thread is very important, and it is preferred that less than one macrovoid be present in a length of 1 mm of the precursor fiber. Here, the macrovoid is a collectively termed void having a spherical, spindle or cylindrical shape having a size of 0.1 to several μm in maximum diameter.

The coagulated thread of the present invention does not have such a macrovoid and is obtained by sufficient and uniform coagulation. When there are many macrovoids, the coagulated thread is devitrified to become cloudy, but the macrovoid is scarcely present in the coagulated thread of the present invention, which thus is not devitrified and does not become cloudy. The presence or absence of the macrovoid can easily be determined by directly observing the coagulated thread under an optical microscope or cutting the coagulated thread by an appropriate method and observing its cut surface under the optical microscope.

Stretching

Subsequently, the obtained coagulated thread is stretched under heat and humidity. This can further enhance the orientation of the fibers. The stretching under heat and humidity is specifically performed by stretching of the coagulated thread while washing with water or stretching in hot water. The stretching simultaneously while washing with water is preferred in terms of simplification and efficiency of the spinning step, and the stretching in the hot water is preferred in terms of productivity. A stretching magnification in the stretching under heat and humidity is preferably 2.5 times or more and more preferably 3 times or more. When the magnification is lower than 2.5 times, the effect of enhancing the orientation of the fiber easily becomes insufficient. The upper limit of the stretching magnification is not particularly limited, and is preferably 6 times or less in terms of stability of the spinning step.

Further, a silicon-based oil agent addition treatment is given to the fiber bundle after finishing the stretching under heat and humidity. For example, the common silicon-based oil agent such as an amino silicone-based oil agent can be used as the silicon-based oil agent. The silicon-based oil agent is prepared at a concentration of 0.4 to 1.5% by mass for the use. The range of the concentration of the silicon-based oil agent is preferably 0.8 to 1.5 by mass.

Subsequently, the fiber bundle after finishing the silicon-based oil agent addition treatment is dried. The obtained dried and compacted thread is further stretched to 1.2 to 4 times by steam stretching or dry heat stretching. The stretching magnification is 1.2 times or more and preferably 1.3 times or more.

Interlace Treatment

Subsequently, a water percentage in the fiber bundle after the steam stretching or the dry heat stretching is adjusted by touch roll if necessary, then an interlace treatment is performed by blowing the air by a known method to obtain the precursor fiber bundle. The interlace treatment is not essential in the present invention, but by imparting the interlace to the filaments in the precursor fiber bundle, it is possible to obtain a fiber bundle keeping a form of one tow with imparting a bundle integrity. Also, by making it difficult to unravel the fiber bundle, the passing of the burning step can be enhanced.

The water percentage before the interlace treatment is performed is preferably 15% by mass or less, more preferably 10% by mass or less, and still more preferably 3 to 5% by mass. When the water percentage exceeds 15% by mass, when the interlace is performed by blowing the air to the fiber bundle, the single fiber becomes difficult to be interlaced. The water percentage herein is a value obtained by the following equation.

$$\text{Water percentage (\% by mass)} = (W - W_0) \times 100 / W_0$$

W: Mass of wet fiber bundle
$W_0$: Mass after drying the wet fiber bundle at 105° C. for 2 hours in a hot wind dryer.

An interlace degree in the precursor fiber bundle to which the interlace treatment was performed is preferably in the range of 5 to 20/m and more preferably in the range of 10 to 14/m. When the interlace degree is 5/m or more, the fiber bundle is difficult to be dissected out and the passing of the burning step is good. When the interlace degree is 20/m or less, impregnation with the resin and fiber spreading are good in the obtained carbon fiber bundle.

The interlace degree in the precursor fiber bundle herein is a parameter indicating how many times per fiber length of 1 m one single fiber of the fiber bundle is interlaced with another adjacent single fiber. The interlace degree is measured by a hook drop method.

Flame-Proof Treatment

Subsequently, the method of producing the carbon fiber of the present invention will be described. First, the flame-proof treatment is performed to the precursor fiber bundle under an oxidation atmosphere at temperature of 240° C. or above and 300° C. or below for 90 minutes or less to make a flame-proofed fiber bundle. "Under the oxidation atmosphere" in the present invention means in air containing an oxidizing substance such as nitrogen dioxide, sulfur dioxide and oxygen.

Flame-Proof Treatment Temperature

When the temperature in the flame-proof treatment is 240° C. or above, the flame-proof treatment can be performed efficiently without causing the runaway of the flame-proof reaction. When the temperature is 300° C. or below, it is possible to perform the flame-proof treatment without thermally decomposing a polyacrylonitrile skeleton in the precursor fiber, and the treatment time for 90 minutes or less can increase the density of the flame-proofed fiber bundle to 1.35 to 1.43 g/cm$^3$.

The temperature in the flame-proof treatment is preferably 250° C. or above in that the flame-proof treatment time is shortened and is preferably 280° C. or below in that the runaway of the flame-proof reaction is inhibited.

Flame-Proof Treatment Time

Flame-Proof Treatment Time

The flame-proof treatment time is preferably 10 to 90 minutes. When the flame-proof treatment time is 10 minutes or more, the oxygen can be diffused sufficiently inside the single fiber that composes the precursor fiber bundle. When the flame-proof treatment time is 90 minutes or less, it is possible to efficiently produce the carbon fiber bundle without impairing the productivity by the flame-proof treatment step in the production step of the carbon fiber bundle. Further, the flame-proof treatment time is more preferably 30 to 70 minutes in terms of enhancing the performance and the productivity of the carbon fiber bundle.

Density of Flame-Proofed Fiber Bundle

The density of the flame-proofed fiber bundle obtained by the flame-proof treatment is preferably 1.35 to 1.43 g/cm$^3$. When the density is 1.35 g/cm$^3$ or more, it is possible to produce the carbon fiber without reducing the yield of the carbon fiber bundle. Generally, it is known that the higher the density of the flame-proofed fiber is, the yield of the carbon fiber bundle is further enhanced, but the performance of the carbon fiber is reduced. When the density of the flame-proofed fiber bundle is 1.43 g/cm$^3$ or less, it is possible to enhance the yield of the obtained carbon fiber bundle while the reduction of the performance of the carbon fiber is inhibited. The density of the flame-proofed fiber bundle is more preferably 1.38 to 1.41 g/cm$^3$ in terms of keeping the performance of and enhancing the yield of the obtained carbon fiber.

Flame-Proof Behavior of Hydroxyalkyl (Meth)Acrylate

In the step of performing the flame-proof treatment to the precursor fiber bundle of the present invention, the progress of the flame-proof treatment is inhibited while the hydroxyalkyl carboxylate group (carboxylate ester group) in the hydroxyalkyl (meth)acrylate unit is thermally decomposed to become the carboxylate group. This enables to assure a time enough to diffuse the oxygen inside the single fiber and subsequently perform the flame-proof treatment rapidly from the high temperature at 240° C. or above when the thermal decomposition of the hydroxyalkyl carboxylate group in the methacrylate hydroxyalkyl unit occurs to make the carboxylate group.

Further, the hydroxyalkyl carboxylate group in the hydroxyalkyl (meth)acrylate unit is a relatively bulky functional group, and has the effect to improve the oxygen permeability in the flame-proof step. The oxygen is efficiently diffused inside the single fiber by these effects while the progress of the flame-proof reaction is inhibited. Thus, even when the flame-proof treatment of the precursor fiber bundle having the large single-fiber fineness is started from the high temperature and performed in a short period of time, the formation of the cross-section double structure is inhibited and the flame-proofed fiber with uniform flame-proof progress degree can be obtained.

Pre-Carbonization Treatment

Pre-Carbonization Treatment

After the flame-proof treatment and before the carbonization treatment, it is also possible to perform a pre-carbonization treatment in which the obtained flame-proofed fiber bundle is treated in an inert gas at temperature of 550° C. or above and 800° C. or below as the highest temperature.

Carbonization Treatment

The carbon fiber bundle can be produced by performing the carbonization treatment to the obtained flame-proofed fiber bundle in the inert gas at temperature of 800° C. or above and 2000° C. or below. A graphite fiber can also be produced by further treating this carbon fiber in the inert gas at high temperature of 2500° C. or above and 2800° C. or below. In the carbon fiber bundle obtained by the carbonization treatment, the diameter of the single fiber is 8 μm or more, and the roundness is 0.90 or less in the cross-sectional shape perpendicular to the fiber axis of the single fiber. It is preferred that the cross-sectional shape be the horsebean shape.

Diameter Di (Maximum Feret Diameter) of Single Fiber in Carbon Fiber Bundle

The cross-section perpendicular to the fiber axis of the single fiber is observed under a scanning electron microscope (SEM), and a major axis (maximum feret diameter) of the cross-section on the obtained image is measured using image analysis software (product name: Image-ProPLUS manufactured by Nippon Roper K.K.). The mean value of major axes of these cross-sections is used as the diameter Di. The diameter Di is preferably 8 to 20 μm and particularly preferably 10 to 15 μm. A method of measuring the diameter Di will be described later.

The carbon fiber bundle obtained by the production method of the present invention is composed of the single fibers having the diameter Di of 8 μm or more. Thus, bending rigidity of each single fiber is high, and the tangle between fibers due to disturbance upon production steps occurs scarcely. Thus, an interlace number in the fiber bundle is reduced. Further, when the single fiber is thick, the single fibers are less in contact with one another in the fiber bundle and friction resistance between the single fibers is reduced. Thus, the carbon fiber bundle has very good spreadability even when the number of the fibers is large. Thus, the diameter Di is more preferably 9 μm or more and still more preferably 10 μm or more. But, when the diameter of the carbon fiber is thick, although the problem of the oxygen permeability described later is solved, an existence probability of the defect is increased in proportion to the increase of a volume per unit length. Thus, the strength of the carbon fiber is reduced. To not reduce the strength of the carbon fiber, the diameter Di is preferably 17 μm or less and more preferably 15 μm or less.

Cross-Sectional Shape of Single Fiber in Carbon Fiber Bundle

The cross-sectional shape of the single fiber in the carbon fiber bundle obtained by the production method of the present invention is represented by the roundness of the cross-section perpendicular to the fiber axis of the single fiber in the carbon fiber bundle. The roundness is defined by the equation (1) in the same manner as in the roundness of the precursor fiber bundle.

The roundness is 0.70 or more and 0.90 or less in the cross-sectional shape of the single fiber in the carbon fiber bundle obtained by the production method of the present invention. The cross-sectional shape is more preferably the horsebean shape. By making the cross-sectional shape the horsebean shape having the roundness of 0.70 or more and 0.90 or less, which is a relatively simple shape, the oxygen is diffused in full measure inside the single fibers that compose the precursor fiber bundle in the flame-proof treatment and the flame-proof reaction progresses sufficiently. Consequently, the feathering in the carbonization step is reduced, a step passing is good, and the strength and the elastic modulus of the obtained carbon fiber bundle can be kept properly. The carbon fiber of the present invention having the roundness of 0.70 or more and 0.90 or less can keep the higher value of the strand strength than the carbon fiber having an almost round cross-sectional shape having the roundness of more than 0.9, even when the single-fiber fineness becomes large. The single fibers can also be packed tightly. Thus, a fiber content rate in the prepreg is enhanced and the dynamic property of the composite material can be enhanced.

Further, a 0° compression strength when a unidirectional prepreg is laminated to make a composite panel exhibits a higher value in the case of using the carbon fiber having the roundness of 0.70 or more and 0.90 or less than in the case of using the carbon fiber having the almost round cross-sectional shape having the roundness of more than 0.9. When the distance from the surface to the center in the single fiber is short, the flame-proof treatment is performed evenly even when the single-fiber fineness is made relatively large. Thus, the roundness of the single fiber that composes the carbon fiber bundle is more preferably 0.88 or less and most preferably 0.86 or less. However, if the cross-sectional shape is changed excessively, the fiber content rate when the prepreg is produced cannot be increased and the dynamic property of the composite material is reduced. Thus, the roundness of the single fiber that composes the carbon fiber bundle is preferably 0.75 or more and more preferably 0.80 or more.

Meanwhile, as described in Japanese Unexamined Patent Application, Publication No. H11-124743, the single fibers are tangled with one another and the spreadability is reduced in the carbon fiber having a relatively simple variant cross-section such as flatness and three leaves. In the single fiber having a complicated variant cross-section such as eight leaves and C type, the single fibers are less tangled with one another, but conversely it becomes impossible to pack the single fibers tightly, the fiber content rate when the prepreg is produced cannot be increased, and the dynamic property of the composite material is reduced.

Surface Morphology of Carbon Fiber

In the carbon fiber bundle of the present invention, it is preferred that a wrinkle extending in a lengthwise direction of the fiber be present on the surface of the carbon fiber. The wrinkle extending in the lengthwise direction of the fiber plays a very important role in appearance of a mechanical property of a fiber-reinforced resin material using the carbon fiber as a reinforcing material. Because, this is directly involved in the formation of an interface phase between the carbon fiber and the resin and characterizes one of three elements, the fiber, the matrix resin and the interface phase that compose the fiber-reinforced resin material. The wrinkle on the surface of the single fiber refers to a concavo-convex form having a certain length or longer in a certain direction. Here, the certain length or longer refers to a length of about 0.6 μm to 1.0 μm. Its direction is not particularly limited, and may be parallel to or perpendicular to or may have some angle to the direction of the fiber axis. Due to the common method of producing the carbon fiber bundle, the wrinkle nearly parallel to the direction of the fiber axis is present on the surface of the common carbon fiber.

It is preferred that the carbon fiber bundle of the present invention has a plurality of groove-shaped concavo-convex parts extending to the lengthwise direction of the single fiber on the surface of the single fiber and the difference in height between the highest and the lowest parts (depth of wrinkle) be 80 μm or less in the range of 2 μm of a circumference length in the single fiber. When the depth of the wrinkle becomes too deep, the bundle integrity of the fiber bundle is reduced, passing through the burning step when the carbon fiber bundle is produced is deteriorated, and the carbon fiber bundle cannot be obtained stably. Also, a surface defect of the carbon fiber bundle is increased, and the strand strength is reduced. When the depth of the wrinkle is shallow, the impregnation is likely deteriorated, but the impregnation is enhanced in the present invention by utilizing the carbon fiber bundle having the large fineness. The depth of the wrinkle on the cross-section in the precursor fiber bundle and the carbon fiber bundle is determined by changing the coagulation bath concentration and temperature and further the stretching condition.

Performance of Carbon Fiber Bundle

In the carbon fiber bundle of the present invention, the strand tensile strength is preferably 3000 MPa or more. When the strand tensile strength is excessively low, such a fiber bundle can scarcely be used in most fields where the carbon fiber is currently used as a structural material. Thus, such a tensile strength is more preferably 3500 MPa or more. When it is 4000 MPa or more, the carbon fiber can be applied to existing most fields for industrial uses including wind mills, automobiles and building materials.

In the carbon fiber bundle of the present invention, the strand tensile elastic modulus is preferably 200 GPa or more. When the strand tensile elastic modulus is excessively low, such a fiber bundle can scarcely be used in most fields where the carbon fiber is currently used as a structural material. Thus, the strand tensile elastic modulus is more preferably 210 GPa or more. When it is 220 GPa or more, the carbon fiber can be applied to the most existing fields.

In the carbon fiber bundle of the present invention, the total fineness is preferably 30000 dtex to 90000 dtex. When the total fineness is in this range, the carbon fiber bundle is suitable for the production of composites/moldings in large size. When the total fineness is increased by combining a plurality of thin fiber bundles, gaps between the fiber bundles occur, and it is difficult to produce the composites/moldings in large size having the high quality. When the total fineness is 30000 dtex or more, the productivity can be increased and the production cost is easily reduced, which is thus preferable. When the total fineness is 90000 dtex or less, the handling is easy. Thus, the total fineness is more preferably 60000 dtex or less and still more preferably 40000 dtex or less in terms of this point.

Surface Treatment of Carbon Fiber Bundle

In the carbon fiber bundle of the present invention, a surface treatment may be performed before a sizing treatment step. For example, it is preferred that affinity and adhesiveness between the carbon fiber and the matrix resin in the composite material be enhanced by performing an electrolytic oxidation in an electrolytic solution or giving oxidation in a gas phase or a liquid phase.

Sizing Treatment Step

A sizing treatment and a drying treatment are performed in a step of performing a sizing treatment to the carbon fiber bundle. The method for the sizing treatment is not particularly limited, and a desired sizing agent may be given to the carbonated fiber bundle. For example, a roller sizing method, a roller immersion method, a spraying method, and the like can be included.

A sizing treatment solution that can be used for the step of giving the sizing treatment to the carbon fiber bundle of the present invention is not particularly limited, and those having the property suitable for higher processing can be selected. For example, in order to evenly impregnate a line of threads, a solution containing the sizing agent is made into an emulsion or a suspension, and this may be adhered to the carbonated fiber bundle, which may be then dried in a drying apparatus to remove the solvent or the dispersion medium.

A major ingredient of the sizing agent in the sizing treatment solution includes, but is not particularly limited to, epoxy resins, epoxy-modified polyurethane resins, polyester resins, phenol resins, polyamide resins, polyurethane resins, polycarbonate resins, polyether imide resins, polyamide imide resins, polyimide resins, polyimide resins, bismaleimide resins, urethane-modified epoxy resins, polyvinyl alcohol resins, polyvinyl pyrrolidone resins, polyether sulfone resins, and the like.

The content of the sizing agent in the sizing treatment solution is not particularly limited, but is preferably 0.2 to 20% by mass and more preferably 3 to 10% by mass. By making the content of the sizing agent in the sizing treatment solution 0.2% by mass or more, it is possible to sufficiently impart the function that is desired to the carbon fiber. Also, by making the content of the sizing agent in the sizing treatment solution 20% by mass or less, an amount of the adhered sizing agent becomes proper, and the impregnation of the carbon fiber bundle with the matrix resin when the composite material is produced, which is a post-step, becomes good.

The solvent or the dispersion medium used for the sizing treatment solution is not particularly limited, but it is preferable to use water in terms of handling and safety.

The amount of the adhered sizing agent is preferably 0.3 to 5% by mass and more preferably 0.4 to 3% by mass based on 100% by mass of the carbon fiber bundle. By making the amount of the adhered sizing agent 0.3% by mass or more, it is possible to sufficiently impart the function that is desired to the carbon fiber. Also, by making the amount of the adhered sizing agent 3% by mass or less, the impregnation of the carbon fiber bundle with the matrix resin when the composite is produced, which is the post-step, becomes good.

In the drying treatment after the sizing treatment, the solvent or the dispersion medium in the sizing treatment solution is dried and removed. A condition at that time is suitably in the range at temperature of 120 to 300° C. for 10 seconds to 10 minutes and more suitably in the range at temperature of 150 to 250° C. for 30 seconds to 4 minutes. When the drying temperature is 120° C. or above, the solvent can be removed sufficiently. When the drying temperature is 300° C. or below, the quality of the carbon fiber bundle to which the sizing treatment was performed can be kept.

The method for the drying treatment is not particularly limited, and for example, a method of drying by contacting the carbon fiber bundle to a hot roll using a vapor steam as a heat source, and a method of drying the carbon fiber bundle in an apparatus in which hot wind is circulated can be included.

Unidirectional Fiber-Reinforced Fabric

The carbon fiber bundle of the present invention can be used suitably for the following unidirectional fiber-reinforced fabric. In the unidirectional fiber-reinforced fabric of the present invention, a weight per unit when the carbon fiber bundle is arranged in the longitudinal direction is preferably 300 to 1000 g/m². Generally, when the weight per unit of the fiber fabric is as small as about 200 g/m², an inter-fiber void becomes large. Thus, the impregnation with the resin becomes good. On the other hand, when the weight per unit of the fiber fabric is large, the inter-fiber void becomes small, the fluidity of the resin becomes worse, impregnation failure occurs and the impregnation takes a long time. In addition, when a molding processing is performed, a small number of laminations by the fabric having the large weight per unit of the fiber fabric can reduce the cost compared with a large number of the lamination by the fabric having the small weight per unit of the fiber fabric. Thus, in the molding processing that requires the lamination, it is advantageous to use the fiber fabric having the weight per unit that is large as possible. By the use of the carbon fiber bundle of the present invention, it is possible to obtain the fiber fabric where the impregnation with the resin is good and the impregnation for a long time is not required even when the weight per unit of the fiber fabric is in the range of 300 to 1000 g/m².

The method of obtaining the fabric having the large weight per unit of the fiber fabric is generally broadly classified into two. One of them is a method of obtaining the fabric having the large weight per unit by using the carbon fiber bundle commonly used and having 12,000 filaments and increasing a weave density of the fabric. The second one is a method of obtaining the fabric using the carbon fiber bundle having 48,000 or more filaments. However, in order to obtain the fabric having the large weight per unit, it is much easier in terms of passing the step that the fabric is woven using the carbon fiber bundle having many filaments, which is referred to as a so-called large tow. When any of these fiber-reinforced fabrics is used as a fiber base material, it is necessary to use a large number of carbon fiber bundles when the carbon fiber bundle having a small number of filaments is used. Also when the carbon fiber bundle having a large number of filaments is used, although the number of carbon fiber bundles used is small, the number of the filaments is large. Thus, in any of these cases, eventually the inter-fiber void becomes small, the fluidity of the resin upon molding processing becomes worse, impregnation failure occurs and the impregnation takes a long time.

In order to solve them, by using the carbon fiber bundle of the large tow and having the single fiber with the large diameter as the fiber-reinforced fabric, the fluidity of the resin becomes good and the impregnation time is largely shortened. A reason for this is that the inter-fiber void becomes large to improve the fluidity of the resin by increasing the diameter of the single fiber. Further in the present invention, the carbon fiber bundle previously defined and having the roundness of 0.7 or more and 0.9 or less in the fiber cross-section of the single fiber is preferred. When the roundness exceeds 0.9, the bundle integrity tends to increase excessively. When the bundle integrity increases excessively, it becomes difficult to dissect out the single fiber evenly. That is, the impregnation with the resin is reduced due to the decreased inter-fiber voids. On the other hand, when the roundness is less than 0.7, the bundle integrity is reduced, the burning step when the carbon fiber bundle is produced is deteriorated, and the carbon fiber bundle cannot be produced stably. Thus, by using the single fiber having the roundness of 0.7 or more and 0.9 or less, the bundle integrity of the carbon fiber bundle can be controlled appropriately, a balance between the bundle integrity and easiness to be dissected is excellent, and the impregnation with the resin upon molding processing is also enhanced.

The fabric used for the present invention is the unidirectional fiber-reinforced fabric where the carbon fiber bundle is arranged in the longitudinal direction, and an assistant thread is used in a transverse direction. A basic structure of this fabric is already well-known for the use for earthquake-proof reinforcing materials. The line of thread having a smaller fineness than that of the carbon fiber bundle used in the longitudinal direction is typically used as the assistant thread in order to enhance the strength of the mechanical physical property of the composite. That is, the carbon fiber bundle arranged in the longitudinal direction and the assistant thread arranged in the transverse direction are always complexed alternatively one by one. Thus, flexion occurs regardless of the size of the carbon fiber bundles and this impairs the intensity reappearance. The degree of the flexion is proportional to the fineness of the assistant thread. Thus, the thicker the assistant thread is, the larger the flexion of the carbon fiber bundle is. The mechanical physical property is also largely reduced. Thus, the assistant thread is preferably thin as possible, but the assistant thread is not particularly limited as long as the morphology of the fabric is kept against an external force.

Glass fibers are often used for the assistant thread in general, but the materials are not limited thereto. Also typically, the number of the assistant threads to be used in the unidirectional fabric is 10/inch or less that is relatively few in consideration of handling of the fabric, and the thin assistant thread and a warp thread are complexed. Thus, there is no binding force and the handling of the fabric is very poor. Thus, the assistant thread containing a polymer having a low melting point is used, and the binding force is kept by adhering the carbon fiber and the assistant thread at their intersection point through the polymer. Thermally fused fibers having the low melting point such as nylon and polyethylene are used as the polymer fiber having the low melting point. When the assistant thread and thermally fused fiber are made into a complexed thread for covering, twisted yarn and paralleled adhesion, there is no problem. Further, a method of utilizing a heat roll or a method of utilizing radiation heat such as far infrared heater may be used as an adhesion method.

Method of Forming CFRP

Figure 4:
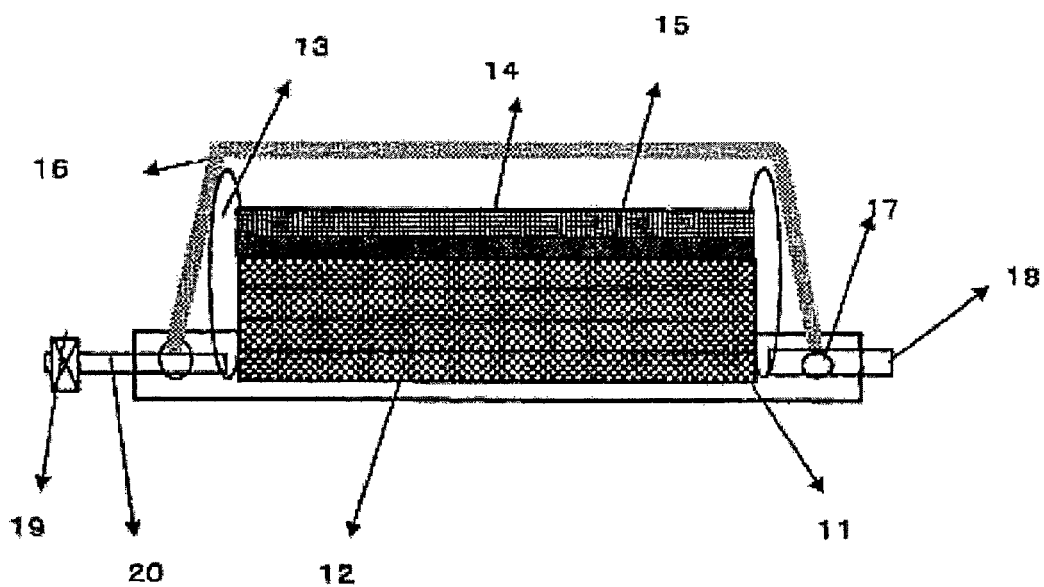
FIG. 4 is a view illustrating a method of forming CFRP of the present invention.

The method of forming CFRP of the present invention is described using FIG. 4. In FIG. 4, a mold releasing agent is applied onto a forming die 11, and the carbon fiber fabric 12 of the present invention is laminated thereon in predetermined layers in a predetermined direction as a fiber base material. Further, Peel ply 15 is laminated thereon, and a medium 14 is placed thereon to diffuse a resin on a surface of the fiber base material. Also, a spiral tube 13 for depositing the resin is placed on both ends in a fiber axis direction of the fiber base material, and a suction spout 18 of a vacuum pump is attached. These are entirely covered with a bag film 16, and a circumference of the bag film 16 is adhered to the forming die 11 with a sealing material 17 so that the air did not leak. A discharge spout 20 of the resin injected from a resin tank is linked to the spiral tube 13. A thermally curable resin that is a syrup and curable at ambient temperature, to which a curing agent in a predetermined amount was added, has been placed in the resin tank (not shown in figure). The impregnation with the resin is largely affected by a viscosity of the resin to be used. A low viscosity article having the good fluidity of the resin is typically used for RTM molding and vacuum bag molding. The viscosity upon injection of the resin is preferably 500 mPa·s or less and more preferably 300 mPa·s or less.

Then the fiber base material covered with the bag film 16 is vacuumized to a vacuum pressure of about 70 to 76 cmHg using the vacuum pump, and then a valve 19 is opened and the resin is injected. An inside covered with the bag film 16 is a vacuum state, and a flow resistance of the resin is smaller in a surface direction of the medium than in a thickness direction of the fiber base material. Thus, the resin is first diffused to the surface of the medium and then the impregnation progresses to the thickness direction of the fiber base material. However, this impregnation degree is considerably affected by the morphology of the carbon fiber fabric 12 used as the fiber base material. Of course, when the fabric has the voids between the lines of fiber threads, the impregnation with the resin to the thickness direction is completed more rapidly. When a monofilament of polyethylene or polypropylene having a fiber diameter of 0.2 to 0.5 mm is used as the medium, it is possible to use sheets formed with mesh tone and raschel knitting, and there is no restriction. It is preferred that the vacuum pump be driven at least until the impregnation with the resin is completed and the inside of the bag film be kept in a vacuum state. After curing the resin, a CFRP molded article is obtained by peeling Peel ply 15, removing the medium 14 and the bag film 16, and releasing from the forming die.

It is necessary that the resin can pass through Peel ply, and nylon fiber fabrics, polyester fiber fabrics or glass fiber fabrics can be used. The smaller the weave density of the fabric is, the larger the space is. Thus, the resin passes easily, but concavo-convex patterns occur on the surface of the fiber base material when the resin is cured and finally peeled. Thus, it is better to select those where the resin passes well as possible and the concavo-convex pattern hardly occurs on the surface. The bag film is necessary to be gas-tight, and a nylon film, a polyester film or the like is used.

Carbon Fiber Prepreg

The present invention also relates to a carbon fiber prepreg composed of the carbon fiber bundle and the matrix resin. The carbon fiber in the carbon fiber prepreg of the present invention is not particularly limited, and includes PAN-based carbon fibers, PITCH-based carbon fibers, and the like. The PAN-based carbon fiber is desirable. Those having the single-fiber fineness of 1.2 to 2.4 dtex are used, and in particular the carbon fiber bundle of the present invention is suitably used. When the single-fiber fineness is 1.2 dtex or more, a compression strength keeping rate is increased when the thickness of the molding is increased. When the single-fiber fineness is 2.4 dtex or less, a mechanical strength of the molding is good. One type of the carbon fiber bundle may be used or multiple types thereof may be aligned regularly or irregularly and used in the same prepreg. Typically, a single direction prepreg is the most suitable for the use where a high specific strength and a high specific elastic modulus are required in the certain direction, but it is possible to use those which are previously processed into a sheet form such as a long fiber mat and a fabric.

Matrix

The matrix resin is not particularly limited, but a flow index thereof is preferably 5000 $Pa^{-1}$ or more. The matrix resin includes epoxy resins, polyester resins, phenol resins, polyimide resins, maleimide resins, resins having an acetylene end, resins having a vinyl end, resins having a cyanate ester end, and the like. The epoxy resin is preferred.

Figure 5:
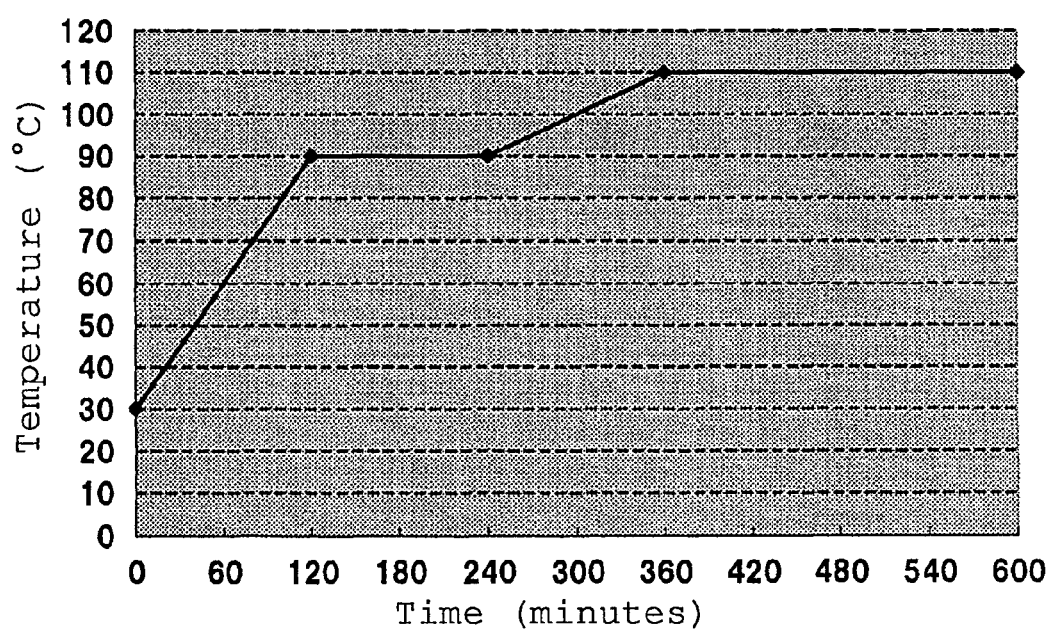
FIG. 5 is a view illustrating a curing condition of a resin composition when a flow index of the resin composition is measured.

The "flow index" is as follows. The viscosity of the resin composition is measured using VAR-100 (manufactured by Rheometrics) under the condition of gap: 0.5 mm, measurement frequency: 10 rad/sec, stress: 300 $dyne/cm^2$, measurement times; every 30 seconds. A temperature condition was set in the same manner as in the curing condition (FIG. 5), and the measurement was terminated when the viscosity of the resin composition was increased by two digits from the lowest viscosity. The flow index is defined by the following equation. But, $\eta$: viscosity, t: time, and measurement values at n times are $\eta n$ and tn.

$$\text{Flow index} = \sum_{i=1}^{n} (1/\eta_i + 1/\eta_{i-1})(t_i - t_{i-1})/2 \qquad (2)$$

Any epoxy resin can be used as the epoxy resin. Any epoxy resin can be combined depending on the purpose, for example, a polyfunctional epoxy resin or an epoxy resin having a rigid ring structure in its backbone can be combined for increasing heat resistance, or a low molecular epoxy resin or an alicyclic epoxy resin can be combined for decreasing the viscosity of the resin composition. For example, a compound having a hydroxyl group in its molecule and a glycidyl ether-type epoxy resin obtained from epichlorohydrin, a compound having an amino group in its molecule and a glycidyl amine-type epoxy resin obtained from epichlorohydrin, a compound having a carboxyl group in its molecule and a glycidyl ester-type epoxy resin obtained from epichlorohydrin, an alicyclic epoxy resin obtained by oxidizing a compound having a double bond in its molecule, or an epoxy resin where two or more groups selected therefrom are present together in its molecule, and the like are used.

Specific examples of the glycidyl ether-type epoxy resin include bisphenol A-type epoxy resins, bisphenol F-type epoxy resins, resorcinol-type epoxy resins, phenol novolac-type epoxy resins, other trisphenol novolac-type epoxy resins, polyethylene glycol-type epoxy resins, polypropylene glycol-type epoxy resins, naphthalene-type epoxy resins, dicyclopentadiene-type epoxy resins, and regioisomers thereof and those obtained by substituting them with an alkyl group or halogen.

Commercially available products of the bisphenol A-type epoxy resins include EPON825, jER826, jER827, jER828 (manufactured by Mitsubishi Chemical Corporation), Epiclon 850 (manufactured by DIC), Epotohto YD-128 (manufactured by Nippon Steel Chemical Co., Ltd.), DER-331, DER-332 (manufactured by Dow Chemical), Bakelite EPR154, Bakelite EPR162, Bakelite EPR172, Bakelite EPR173, and Bakelite EPR174 (manufactured by Bakelite AG).

Commercially available products of the bisphenol F-type epoxy resins include jER806, jER807, jER1750 (manufactured by Mitsubishi Chemical Corporation), Epiclon 830 (manufactured by DIC), Epotohto YD-170, Epotohto YD-175 (manufactured by Nippon Steel Chemical Co., Ltd.), Bakelite EPR169 (manufactured by Bakelite AG) and GY281, GY282, GY285 (manufactured by Huntsman Advanced Materials), and the like.

Commercially available products of the resorcinol-type epoxy resins include Denacol EX-201 (manufactured by Nagase ChemteX Corporation), and the like.

Commercially available products of the phenol novolac-type epoxy resins include jER152, jER154 (manufactured by Mitsubishi Chemical Corporation), Epiclon 740 (manufactured by DIC), EPN179, EPN180 (manufactured by Huntsman Advanced Materials), and the like.

Trisphenol novolac-type epoxy resins include Tactix742 (manufactured by Huntsman Advanced Materials), EPPN501H, EPPN501HY, EPPN502H, EPPN503H (manufactured by Nippon Kayaku Co. Ltd.), jER1032 (manufactured by Mitsubishi Chemical Corporation), and the like.

Specific examples of the glycidyl amine-type epoxy resin include tetraglycidyl diaminodiphenyl methanes, glycidyl compounds of aminophenol, glycidyl anilines, and glycidyl compounds of xylene diamine, and the like.

Commercially available products of tetraglycidyl diaminodiphenyl methanes include Sumiepoxy ELM434 (manufactured by Sumitomo Chemical Co., Ltd.), Araldite MY720, Araldite MY721, Araldite MY9512, Araldite MY9612, Araldite MY9634, Araldite MY9663 (manufactured by Huntsman Advanced Materials), jER604 (manufactured by Mitsubishi Chemical Corporation), Bakelite EPR494, Bakelite EPR495, "Bakelite EPR496 and Bakelite EPR497 (manufactured by Bakelite AG), and the like.

Commercially available products of the glycidyl compounds of aminophenol and aminocresol include jER630 (manufactured by Mitsubishi Chemical Corporation), Araldite MY0500, Araldite MY0510, Araldite MY0600 (manufactured by Huntsman Advanced Materials), Sumiepoxy ELM120 and Sumiepoxy ELM100 (manufactured by Sumitomo Chemical Co., Ltd.), and the like.

Commercially available products of glycidyl anilines include GAN, GOT (manufactured by Nippon Kayaku Co., Ltd.), Bakelite EPR493 (manufactured by Bakelite AG), and the like. The glycidyl compounds of xylene diamine include TETRAD-X (manufactured by Mitsubishi Gas Chemical Company Inc.).

Specific examples of the glycidyl ester-type epoxy resins include diglycidyl phthalate ester, diglycidyl hexahydrophthalate ester, diglycidyl isophthalate ester, diglycidyl dimer acid ester, and various isomers thereof.

Commercially available products of diglycidyl phthalate ester include Epomic R508 (manufactured by Mitsui Chemicals Inc.), Denacol EX-721 (manufactured by Nagase ChemteX Corporation), and the like.

Commercially available products of diglycidyl hexahydrophthalate ester include Epomic R540 (manufactured by Mitsui Chemicals Inc.), AK-601 (manufactured by Nippon Kayaku Co., Ltd.), and the like.

Commercially available products of diglycidyl dimer acid ester include jER871 (manufactured by Mitsubishi Chemical Corporation), Epotohto YD-171 (manufactured by Nippon Steel Chemical Co., Ltd.), and the like.

Commercially available products of the alicyclic epoxy resin include Celloxide 2021P (manufactured by Daicel Corporation), CY179 (manufactured by Huntsman Advanced Materials), Celloxide 2081 (manufactured by Daicel Corporation), and Celloxide 3000 (manufactured by Daicel Corporation), and the like.

Epoxy resins having an oxazolidone ring in its skeleton include AER4152, AER4151, LSA4311, LSA4313, LSA7001 (manufactured by Asahi Kasei Corporation), and the like.

Epoxy resins having a naphthalene skeleton in its skeleton include HP-4032, HP-4700 (manufactured by DIC), NC-7300 (manufactured by Nippon Kayaku Co., Ltd.), and the like.

Epoxy resins having a dicyclopentadiene skeleton in its skeleton include XD-100 (manufactured by Nippon Kayaku Co., Ltd.), HP7200 (manufactured by DIC), and the like.

Epoxy resins having an anthracene skeleton in its skeleton include YL7172YX-8800 (manufactured by Mitsubishi Chemical Corporation), and the like.

Epoxy resins having a xanthen skeleton in its skeleton include EXA-7335 (manufactured by DIC), and the like.

Preferably, the bisphenol A-type epoxy resin and the epoxy resin having the oxazolidone ring in its skeleton are used.

Curing Agent

Amine types, acid anhydride, phenol, mercaptan types, Lewis acid amine complex, onium salts, imidazole and the like are used as a curing agent for the epoxy resin, but those having any structure may be used as long as it can cure the epoxy resin. Preferably, aromatic amine such as diaminodiphenyl methane and diaminodiphenyl sulfone, imidazole derivatives, dicyandiamide, tetramethylguanidine, thiourea addition amine and isomers and modified ones thereof are included. Dicyandiamide is particularly preferred.

An appropriate curing aid can be combined with these curing agents in order to enhance a curing activity. As preferred examples, an example where dicyandiamide is combined with a urea compound such as 3-phenyl-1,1-dimethylurea, 3-(3,4-dichlorophenyl)-1,1-dimethylurea (DCMU), 3-(3-chloro-4-methylphenyl)-1,1-dimethylurea, 2,4-bis(3,3-dimethylureid) toluene, methylenediphenylbis(dimethylureid) or phenyldimethylurea (PDMU) as the curing aid; an example where carboxylic anhydride or a novolac resin is combined with tertiary amine as the curing aid; and an example where diaminodiphenyl sulfone is combined with an imidazole compound, a urea compound such as phenyldimethylurea (PDMU) or an amine complex such as monoethylamine trifluoride or an amine trichloride complex as the curing aid are available. 2,4-bis(3,3-dimethylureid) toluene and methylenephenyl bis(dimethylureid) are industrially available as Omicure 24 (manufactured by PTI Japan) and Micure 52 (manufactured by PTI Japan), respectively. The preferred curing aid is 3-(3,4-dichlorophenyl)-1,1-dimethylurea (DCMU).

EXAMPLES

Hereinafter, the present invention will be specifically described with reference to Examples. Each measurement method in Examples is as follows.

1. Composition of Polyacrylonitrile-Based Copolymer

A composition (ratio (mol %) of each monomer unit) of the copolymer was measured as follows using $^1$H-NMR method. Dimethylsulfoxide-$d_6$ was used as a solvent, the copolymer was dissolved therein, and the measurement was performed using an NMR measurement apparatus (product name: GSZ-400 model manufactured by JEOL Ltd.) under a condition of cumulated number: 40 and measurement temperature: 120° C., and the ratio of each monomer unit was calculated from an integrated ratio of chemical shift.

2. Specific Viscosity of Polyacrylonitrile-Based Copolymer

A copolymer solution was obtained by dispersing 0.5 g of the copolymer in 100 ml of dimethylformamide and keeping it at 75° C. for 40 minutes. A viscosity η of this solution and a viscosity η0 of the solvent were measured at 25° C. using an ubbelohde type viscometer, and a specific viscosity lisp was calculated from the following equation.

$\eta sp=(\eta-\eta_0)/5\eta_0$

3. Melting Point Under Heat and Humidity in Polyacrylonitrile-Based Copolymer

The copolymer was passed through a sieve with a mesh of 0.5 mm, 5 mg thereof was precisely weighed and placed in a 15 μl sealed sample vessel manufactured by SII Nanotechnology and made from Ag (for DSC200 system) (treated with heat in air at 300° C. for 30 minutes), and 5 μl of pure water was added and the vessel was sealed tightly. The measurement was performed by a heat flux type differential scanning calorimeter at a temperature rising rate of 10° C./minute from room temperature to 230° C. using DSC/220 manufactured by Seiko Instruments Inc., a temperature corresponding to a top of an endothermic peak that appeared at around 150° C. to 200° C. was read out, and this was used as a melting point under heat and humidity Tm (° C.).

4. Contact Angle of Polyacrylonitrile-Based Copolymer with Water

The copolymer was dissolved in dimethylacetamide to prepare a copolymer solution at a mass concentration of 21%, and this copolymer solution was applied onto a glass plate so that a constant thickness was obtained. Then, this glass plate on which this copolymer solution had been applied was dried in air at 120° C. for 6 hours using a hot wind dryer to evaporate the solvent and make a film having a thickness of 20 to 40 μm. On the surface of this film, 1 μl of water was dropped, a water contact angle was measured 5 times every one second from 3 seconds after dropping using a contact angle measurement apparatus (product name: DM301 manufactured by Kyowa Interface Science Co., Ltd.) and their mean value θ' was calculated. Further, a position of the surface on which the water was dropped was changed, the same manipulation was repeated total three times, an arithmetic mean of three times was calculated, and this value was used as the water contact angle θ of the copolymer.

5. Measurement of Oxidation Depth De of Polyacrylonitrile-Based Copolymer

The copolymer was dissolved in dimethylformamide to prepare a copolymer solution at a mass concentration of 25%, and this copolymer solution was applied onto a glass plate so that the constant thickness was obtained. Then, this glass plate on which this copolymer solution had been applied was dried in air at 120° C. for 6 hours using the hot wind dryer to evaporate the solvent and make a film having the constant thickness in the range of 20 to 40 μm. A flame-proof treatment was performed to the obtained film by treating the film with heat in air at 240° C. for 60 minutes and further in air at 250° C. for 60 minutes using the hot wind dryer. The obtained flame-proofed film was cut into a size of longitudinal 30 mm and transverse 10 mm, embedded in an epoxy resin, and polished so that a cross-sectional surface of the film was exposed. A cross-section perpendicular to the surface of the polished flame-proofed film was observed at a magnification of 1500 using a fluorescence microscope (brand name: MICROFLEX AFX DX). An oxidation progressing part was observed as a relatively dark layer and an oxidation non-progressing part was observed as a relatively light layer in the cross-section. A distance from the surface of the film to a boundary between the dark layer and the light layer was measured at least at 5 points on one cross-section. The same measurement was further repeated on three cross-sections. Their arithmetic mean was used as the oxidation depth De (μm).

6. Single-Fiber Fineness of Precursor Fiber

A single-fiber fineness is a weight per 10000 m of one fiber. Two fiber bundles having a length of 1 m were taken from any site of a precursor fiber bundle, each mass thereof was measured, this value was divided by the number of filaments (i.e., the number of holes of a nozzle), then multiplied by 10000 to calculate a mean value of the two bundles. This value was used as the single-fiber fineness.

7. Roundness of Precursor Fiber Bundle (1) Preparation of Sample

A cotton thread is put with half wind on near a center of a lengthwise direction of a precursor fiber bundle (sample fiber) having a length of about 200 mm, and both ends of the cotton thread were combined to pass through a polyethylene thin tube having a length of about 15 mm (Hibiki polyethylene thin tube No. 3 manufactured by Sansyo Co., Ltd.). At that time, the sample fiber was attached to an end part of the tube. Then, anti-static agent (Statiside manufactured by Mitsui & Co. Plastics Ltd.) was entirely blown onto the sample fiber (for about 2 seconds). The cotton thread was drawn to introduce the sample fiber into the tube, and the tube in which the sample fiber had been placed was cut into about 1 to 3 mm on a rubber plate using a razor.

(2) Observation Under SEM

A carbon double stick tape (conductive carbon double stick tape for SEM, width: 8 mm manufactured by Nisshin EM Corporation) was attached on a sample stage of SEM, and the sample tube obtained in (1) above was attached thereon using a precise forceps so that a fiber cross-section faced directly above. Then, the sample was observed using SEM (PHILIPS FEI-XL20), and five photographs on which five or more fiber cross-sections were taken were photographed randomly.

(3) Measurement of Roundness

The contour of the fiber cross-section was traced using image analysis software (product name: Image-ProPLUS manufactured by Nippon Roper K.K.), then a circumference length L and an area S were measured. For each sample, 20 fiber cross-sections from 5 photographs, but 3 or more from one photograph were randomly selected and measured, the mean values of L and S were obtained, and the roundness was calculated from the following equation.

Roundness=$(4\pi S)/L^2$

8. Constant Velocity Temperature Rising Exothermic Curve of Precursor Fiber Bundle The constant velocity temperature rising exothermic curve of the precursor fiber bundle was measured as follows using the heat flux type differential scanning calorimeter. First, the precursor fiber bundle was cut into a length of 4.0 mm, 4.0 mg thereof was precisely weighted, packed in a 50 µl sealed sample vessel manufactured by SII and made from Ag (brand name: P/N SSC000E030), and covered with a mesh cover manufactured by SII and made from Cu (brand name: P/N 50-037) (treated with heat in air at 450° C. for 15 minutes). Then, the measurement was performed using the heat flux type differential scanning calorimeter: DSC/220 manufactured by SII under the condition of a temperature rising rate of 10° C./minute and an air supply amount of 100 ml/minute (standard of the air supply amount: 0.10 MPa at 30° C.) at from room temperature (30° C.) to 450° C. A calorific value at 230° C. or above and 260° C. or below and a calorific value at 260° C. or above and 290° C. or below in the constant velocity temperature rising exothermic curve were used as a heat quantity Ja and a heat quantity Jb, respectively.

9. Method of Measuring Calorific Value of Precursor Fiber by Heat Flux Type Differential Scanning Calorimeter The precursor fiber bundle was cut into a length of 2.0 mm, about 7.0 mg thereof was packed in an open sample pan manufactured by SSI and made from Al (brand name: P/N SSSC000E030), covered with an SUS mesh cover (brand name: P/N 50-038) (treated with heat in air at 450° C. for 15 minutes), and subjected to the measurement of a heat flow. The mass of the sample pan, the SUS mesh, and the precursor fiber bundle was weighed using a precision balance to a ¹⁄₁₀₀ mg.

The measurement was performed using the heat flux type differential scanning calorimeter: DSC/220 manufactured by SII as the apparatus under the condition of a temperature rising rate of 20° C./minute at from room temperature to 210° C. and a temperature rising rate of 2° C./minute at from 210 to 300° C. and an air supply amount of 100 ml/minute (standard of the air supply amount: 30° C., 0.10 MPa).

A time interval of taking the heat flow is 0.5 seconds. The calorific value was obtained by using the heat flow at 215° C. as 0 and integrating the heat flow at 215 to 300° C. by a time. Specifically, a total sum of [heat flow (µW)×0.5 (s)] at 215 to 300° C. was obtained using the temperature and the heat flow at every intake time, and the calorific value at 215 to 300° C. was obtained. The calorific value was divided by a sample amount to obtain the calorific value per unit mass.

10. Method of Measuring Solid $^1$H-NMR of Precursor Fiber

The precursor fiber bundle was packed without space into a sample tube made by cutting a commercially available sample tube for NMR having an external diameter of 5 mm into a length of 50 mm so that the lengthwise direction corresponded with the fiber axis, and subjected to the measurement. The length of the fiber sample in the sample tube was about 6 mm. AVANCEII 300 MHz magnet manufactured by Bruker Bio-Spin was used as the apparatus. A static probe was used as a probe and set so that the fiber axis was perpendicular to a magnetic field.

When an interval of 90° pulse and 180° pulse in Hahn echo method was used as τ, a spectrum at τ=6 µS was A and a spectrum at τ=60 µS was B. Then a difference spectrum between A and B was C, and a half-value width of C was obtained. The difference spectrum can also be obtained by attached analysis software, and the half-value width can also be obtained by the attached analysis software. The measurement condition is as follows.

Measurement temperature: 160° C., measurement atmosphere: nitrogen, Hahn echo method, 90° pulse 5 µs, 180° pulse 10 µs, cumulated number: 8, and repeat waiting time: 12 s.

11. Diameter and Roundness of Carbon Fiber Bundle (1) Preparation of Sample

A carbon fiber bundle cut into a length of 5 cm was embedded in an epoxy resin (Epomount base: Epomount curing agent=100:9 (mass ratio)), and cut into a length of 2 cm to expose a cross-sectional surface, to which a mirror surface treatment was given.

(2) Etching Treatment on Surface to be Observed

Further, in order to clarify a contour of the fiber, an etching treatment was performed to the cross-sectional surface of the sample by the following method. Apparatus used: Plasma Etching Apparatus JP-170 manufactured by JEOL Ltd. Treatment condition: (Atmosphere gas=Ar/O$_2$=75/25, plasma output power: 50 W, vacuum degree: about 120 Pa, treatment time period: 5 minutes).

(3) Observation Under SEM

The cross-sectional surface of the samples obtained by (1) and (2) above was observed using SEM (PHILIPS FEI-XL20), and five photographs of 5 or more fiber cross-sections on an image were taken randomly.

(4) Measurement of Diameter of Single Fiber in Carbon Fiber Bundle

For each sample, 20 single fiber cross-sections from 5 SEM photographs, but 3 or more from one photograph were randomly selected, the contour of the fiber cross-section was traced using image analysis software (product name: Image-ProPLUS manufactured by Nippon Roper K.K.), and a major axis (maximum feret diameter) d of the cross-section was measured. A mean value of the major axes d of all single fiber cross-sections selected was used as the diameter Di of the single fiber in the carbon fiber bundle.

(5) Measurement of Roundness of Single Fiber in Carbon Fiber Bundle

The contour of the fiber cross-section was traced using the image analysis software (product name: Image-ProPLUS manufactured by Nippon Roper K.K.), and a circumference length L and an area S were measured. For each sample, 20 fiber cross-sections from 5 photographs, but 3 or more from one photograph were randomly selected and measured, the mean values of L and S were obtained, and the roundness was calculated from the following equation.

$$\text{Roundness}=(4\pi S)/L^2$$

12. Strand Strength and Strand Elastic Modulus of Carbon Fiber

The physical properties (strand strength and strand elastic modulus) of the carbon fiber were measured according to the methods described in JISR 7601.

13. Depth of Surface Wrinkle

Several single fibers of the carbon fiber were placed on a sample stage, both ends thereof were secured, and dotite was applied to a circumference thereof to use as a measurement sample. The measurement was performed using an atom force microscope (product name: SPI3700/SPA-300, manufactured by Seiko Instruments Inc., using a cantilever (manufactured by Silicon Nitride) with an AFM mode. A measurement image obtained by scanning the single fiber in the range of 2 to 7 μm was reversely converted to remove a curvature factor of the fiber after cutting a low frequency components by two dimensional Fourier transform. The depth of the wrinkle was measured five times from the cross-section of the plane image thus obtained, and their mean value was used as the depth of the surface wrinkle.

14. Evaluation of Fiber Spreading of Carbon Fiber Bundle

A tow width when the carbon fiber bundle was run on a metal roll at a running speed of 3.4 m/minute under a constant tensile force (0.075 cN/dtex) was measured using a digital dimension meter (LS-7030M, manufactured by Keyence), and was used as an indicator of the fiber spreading.

15. Evaluation of Impregnation

Figure 3:
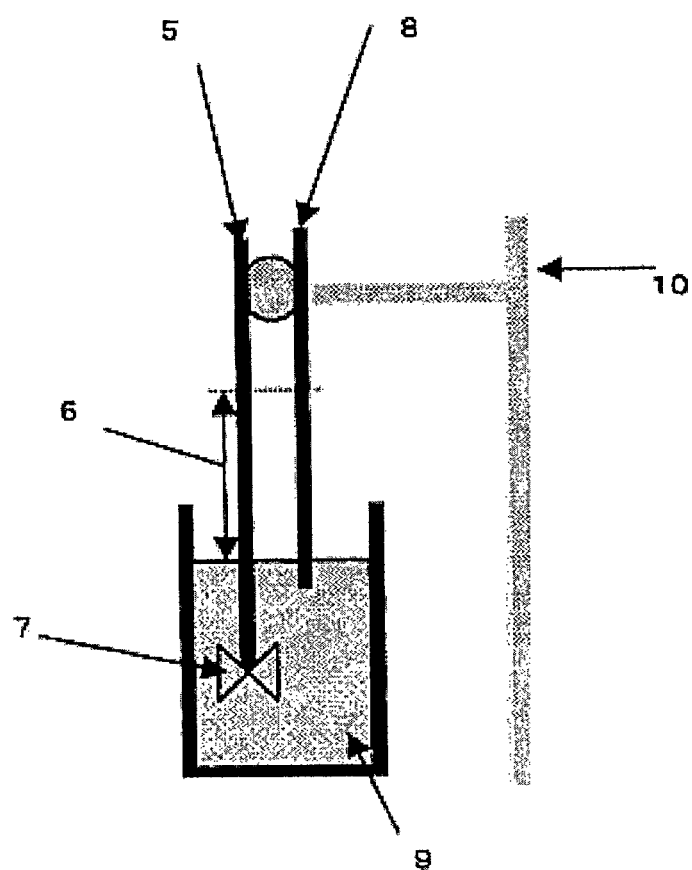
FIG. 3 is a schematic view illustrating an evaluation method for impregnation of the carbon fiber bundle with the resin.

The evaluation of the impregnation of the carbon fiber bundle is described using FIG. 3. A carbon fiber bundle 5 was cut out into a length of 30 cm, which was coated with white powder (talc), and one end of the carbon fiber bundle was attached with a clip 7. Formamide 9 is poured into a container, and a side on which the fiber was attached with the clip was hung down so that the carbon fiber bundle was perpendicular to a liquid surface. The clip was submerged into formamide, the submerging was stopped when the clip was below the liquid surface, the fiber was left to stand for 20 minutes, and the carbon fiber bundle was impregnated with formamide. A height at which formamide had impregnated was measured after 20 minutes using a ruler 8. This manipulation was repeated six times, and their mean value was obtained to use as an "elevated height H". The higher the elevated height indicates that the better the impregnation is. The white powder (talc) was used for making it easy to confirm the height of the impregnation with formamide. In the carbon fiber bundle of the present invention, the height of the impregnation is preferably 100 mm or more.

16. Evaluation of Impregnation in VaRTM Formation

A unidirectional fabric having the weight per unit of 600 g/m² was woven using the carbon fiber bundle of the present invention as a warp thread and a line of thread adhering a thermally fused fiber (manufactured by Toray Industries Inc.) to a glass fiber of 22.5 tex (manufactured by Unitika Glass fiber Co., Ltd.) as a weft thread and using Repier looms (manufactured by Tsudakoma Corporation). The obtained fabric was cut into a size of longitudinal 500 mm and transverse 500 mm, and three were laminated by adjusting to a fiber axis direction. A sheet to be removed after curing the resin, so-called Peel Ply (nylon taffeta #15) was laminated on this laminated product (i.e., fiber base material), and a medium (mesh material made from polyethylene, AIRTECH GREENFLOE75) was placed thereon for diffusing the resin entirely on the fiber base material.

A spiral tube (product No. TSP-10: material polyethylene, thickness: 0.8 mm, external diameter: 10 mm, spiral pitch: 11.4 mm manufactured by Trusco) for depositing the resin on both ends of the fiber axis direction of the fiber base material was disposed, and a suction spout of a vacuum pump was attached. They were entirely covered with a bag film (Lightron #8400), and the circumference of the bag film was adhered to a forming die with a sealing material (Vacuum sealant RS200) so that the air did not leak.

Subsequently, this was linked to a discharge spout of the resin injected from a resin tank. As the resin, an epoxy resin for molding infusion (main base: DENATITE XNR6815 and curing agent: DENATITE XNH6815 manufactured by Nagase ChemteX Corporation) was combined in a ratio of 100 parts by mass of the main base and 27 parts by mass of the curing agent (viscosity of the mixture 260 mPa·S) for the use. Then, the fiber base material covered with the bag film was vacuumized to a vacuum pressure of about 70 to 76 cmHg using the vacuum pump, and then the valve was opened and the resin was injected.

At that time, the time until the impregnation with the resin was completed was measured to evaluate the impregnation with the resin. The impregnation with the resin was evaluated by using the time from starting the injection of the resin until the three fabrics were entirely impregnated with the resin as a determination criterion. The impregnation was evaluated as follows.

A: Impregnation time was less than 10 minutes
B: Impregnation time was 10 minutes or more.

Example 1

To a 80 liter aluminium polymerization kettle equipped with a turbine agitator wing (agitator wing: 240φ, 4 wings of two steps of 55 mm×57 mm), 76.5 L of deionized exchange water was added to reach an over flow spout of the kettle, 0.01 g of ferrous sulfate ($Fe_2SO_4 \cdot 7H_2O$) was added, pH of the reaction was adjusted to 3.0 using sulfuric acid, and the temperature in the polymerization kettle was kept at 57° C.

Subsequently, ammonium persulfate at 0.10 mol %, ammonium hydrogen sulfide at 0.35 mol %, ferrous sulfate ($Fe_2SO_4 \cdot 7H_2O$) at 0.3 ppm and sulfuric acid at $5.0 \times 10^{-2}$ mol %, which were redox polymerization initiators for the monomer were dissolved in deionized exchange water, respectively. These solution were continuously supplied from 50 minutes before starting the polymerization, agitation was performed at an agitation speed of 180 rpm and an agitation power of 1.2 kW/m³, and the average retention time of the monomer in the polymerization kettle was set to be 70 minutes.

Then, the monomer composed of acrylonitrile (hereinafter abbreviated as "AN") at 98.7 mol % and 2-hydroxyethyl methacrylate (hereinafter abbreviated as "HEMA") at 1.3 mol % was constituted to make water/monomer=3 (mass ratio) at the start of the polymerization, and this polymer solution was continuously supplied. Subsequently, one hour after starting the polymerization, the polymerization reaction temperature was lowered to 50° C., this temperature was kept, and polymerization slurry was continuously taken out from the overflow spout of the polymerization kettle.

An aqueous solution of a polymerization terminator obtained by dissolving sodium oxalate at $0.37 \times 10^{-2}$ mol % and sodium bicarbonate at $1.78 \times 10^{-2}$ mol % in deionized exchange water was added to the polymerization slurry to make pH of the polymerization slurry 5.5 to 6.0. This polymerization slurry was dehydrated by an Oliver-type continuous filter, and deionized exchange water (70 L) in an amount that was 10 times larger than that of the polymer was added to disperse again. The polymer slurry after being dispersed again was dehydrated again by the Oliver-type continuous filter, a pellet was formed and dried using a hot wind circulating dryer at 80° C. for 8 hours, and pulverized in a hammer mill to obtain a polyacrylonitrile-based copolymer A. In the obtained copolymer A, its composition was composed of 98.5 mol % of an AN unit and 1.5 mol % of an HEMA unit, a specific viscosity was 0.21, and a melting point under heat and humidity was 170° C. Further, a water contact angle and an oxidation depth De in this copolymer A were 62.3° and 4.5 μm, respectively.

This copolymer was dissolved in an organic solvent such as dimethylacetamide to prepare a spinning neat solution at a concentration of 21% by mass. Then, threads were spun by a wet spinning method under a coagulation bath condition of a concentration of 60% by mass and temperature of 35° C. to obtain a precursor fiber bundle. A single-fiber fineness, the filament number and a fiber density in this precursor fiber bundle were 2.0 dtex, 30000 and 1.18 g/cm$^3$, respectively, and its cross-sectional shape had a roundness of 0.85 and a horsebean shape. Further, heat quantities Ja and Jb obtained by the measurement using the heat flux type differential scanning calorimeter were 185 kJ/kg and 740 kJ/kg, respectively.

A flame-proof treatment in air heated at 250 to 290° C. in a hot wind circulating flame-proof furnace with an extension rate of +2% for 60 minutes was performed to this precursor fiber bundle to obtain a flame-proofed fiber bundle. A density of the obtained flame-proofed fiber bundle was 1.392 g/cm$^3$.

Subsequently, a carbonization treatment was performed to this flame-proofed fiber bundle by treating with low temperature at the highest temperature of 660° C. with an extension rate of 3.0% for 1.5 minutes under a nitrogen atmosphere and treating in a high temperature treatment furnace at the highest temperature of 1350° C. with an extension rate of −4.5% for 1.5 minutes under a nitrogen atmosphere to obtain a carbon fiber bundle.

The diameter Di and the roundness of the obtained carbon fiber were 9.43 μm and 0.84, respectively. Further, a strand tensile strength was 4300 MPa and a strand tensile elastic modulus was 245 GPa, which were high. This is because the compactness and homogeneity enough for performance reappearance of the carbon fiber are kept by containing the HEMA unit in the precursor fiber, an exothermic property to sufficiently diffuse the oxygen inside the fiber is kept even when the flame-proof treatment at high temperature for a short period of time, and additionally the even flame-proof treatment becomes possible by the short distance from the surface to the center of the cross-section of the fiber due to the horsebean shape of the fiber cross-section in the precursor fiber.

Examples 2 to 15

Copolymers A, B, C or F, G were obtained in the same manner as in Example 1, except that a supply ratio (molar ratio) of the monomers upon start of the polymerization was changed as shown in Table 1 or Table 2. HPMA and HEA in Table 1 or 2 are 2-hydroxypropyl methacrylate and 2-hydroxyethyl acrylate, respectively. The composition, the specific viscosity, the melting point under heat and humidity of the obtained copolymers, and the water contact angle and the oxidation depth De of the film obtained from each copolymer are shown in Table 1 or Table 2.

A spinning neat solution was prepared using each of these copolymers and the threads were spun in the same manner as in Example 1 to obtain a precursor fiber bundle. The single fiber fineness, the filament number, the fiber density, the coagulation bath condition, the roundness, the cross-sectional shape, the heat quantities Ja and Jb of each precursor fiber bundle are shown in Table 1 or Table 2.

Then, the flame-proof treatment was given to each of these precursor fiber bundles in the hot wind circulating flame-proof furnace in heated air at temperature with the extension rate for the time shown in Table 1 or Table 2. The density of obtained each flame-proofed fiber is shown in Table 1 or Table 2.

Further, the carbonization treatment was performed to this flame-proofed fiber bundle in the same manner as in Example 1 to obtain a carbon fiber bundle. The diameter, the roundness, the fiber spreading, the strand tensile strength, and the strand elastic modulus of the obtained carbon fiber are shown in Table 1 or Table 2.

The cross-sectional shape of the carbon fiber obtained in Examples 2 to 15 is the horsebean type having the roundness of 0.78 to 0.88, and both the strand tensile strength and the strand tensile elastic modulus exhibited the high values. This is because the precursor fiber has the sufficient compactness and homogeneity and the even flame-proof treatment is possible like Example 1. It was also confirmed that the tow width in the obtained carbon fiber bundle was wider than that obtained from the precursor fiber bundle having a round cross-sectional shape and having the same single fiber fineness, and the obtained carbon fiber bundle was excellent in fiber spreading.

Comparative Examples 1 to 14

Copolymers A, B, D or E were obtained in the same manner as in Example 1, except that a supply ratio (molar ratio) of the monomers upon start of the polymerization was changed as shown in Table 3 or Table 4. AAm, MAA, and IBMA in Table 3 or Table 4 are acrylamide, methacrylic acid and isobutyl methacrylate, respectively. The composition, the specific viscosity, the melting point under heat and humidity of the obtained copolymers, and the water contact angle and the oxidation depth De of the film obtained from each copolymer are shown in Table 3 or Table 4.

A spinning neat solution was prepared using each of these copolymers and the threads were spun in the same manner as in Example 1 to obtain a precursor fiber bundle. The single fiber fineness, the filament number, the fiber density, the coagulation bath condition, the roundness, the cross-sectional shape, the heat quantities Ja and Jb of each precursor fiber bundle are shown in Table 3 or Table 4.

Then, the flame-proof treatment was performed to each of these precursor fiber bundles in the hot wind circulating flame-proof furnace in heated air at temperature with the extension rate for the time shown in Table 3 or Table 4. The density of obtained each flame-proofed fiber is shown in Table 3 or Table 4.

Further, the carbonization treatment was given to this flame-proofed fiber bundle in the same manner as in Example 1 to obtain a carbon fiber bundle. The diameter, the roundness, the fiber spreading, the strand tensile strength, and the strand elastic modulus of the obtained carbon fiber are shown in Table 3 or Table 4.

The cross-sectional shape of the carbon fiber obtained in Comparative Example 1 was a round type having the diameter of 7.6 μm and the roundness of 0.95. Further, the strand tensile strength and the strand tensile elastic modulus exhibited low values, which were 1910 MPa and 222 GPa, respectively. This is because the distance from the surface to the center of the cross-section of the fiber was long due to the round type of the fiber cross-sectional shape in the precursor fiber and thus the flame-proof treatment could not be given evenly.

The cross-sectional shape of the carbon fiber obtained in Comparative Example 2 was the horsebean type having the diameter of 9.4 μm and the roundness of 0.85. However, the strand tensile strength and the strand tensile elastic modulus exhibited lower values than in Example 1. This is because the compactness or the homogeneity of the precursor fiber bundle could not be kept due to the monomer such as the HEMA unit having the hydrophilic group was not contained in the copolymer that composes the precursor fiber and thus the water contact angle of the film was 74.4° that was very high, and the precursor fiber was plasticized before the flame-proof reaction progressed and the fiber was extended in the flame-proof step because the heat quantity Ja was 52 kJ/kg that was very small. In the condition of this Comparative Example, the heat quantity Ja was 340 kJ/kg that was very small. Thus, a flame-proof reactivity is low, a very long time is required for the flame-proof treatment, and the productivity is prominently impaired.

The cross-sectional shape of the carbon fiber obtained in Comparative Example 3 was the horsebean type having the diameter of 9.4 μm and the roundness of 0.81. However, the strand tensile strength and the strand tensile elastic modulus exhibited lower values than in Example 1. This is because, since a site of the carboxyl group in the copolymer that composes the precursor fiber was not hydroxyalkylated, the heat quantity Jb was 1150 kJ/kg that was very high, the flame-proof reaction progressed at once, and the cross-section double structure was easily formed. Also, because the oxidation depth De of the film was 3.0 μm that was small and the oxygen permeability was low, which meant that the oxygen could not be diffused inside the precursor fiber having the large single fiber fineness and the flame-proof treatment could not be given evenly.

The cross-sectional shape of the carbon fiber obtained in Comparative Example 4 was the horsebean type having the diameter of 11.9 μm and the roundness of 0.82. However, the strand tensile strength and the strand tensile elastic modulus exhibited the lower values than in Example 1. This seems to be due to the same reasons as in Comparative Example 3.

In Comparative Example 5, the carbon fiber bundle could not be sampled. This is because, since the site of the carboxyl group in the copolymer that composes the precursor fiber was not hydroxyalkylated, the heat quantity Jb was 1150 kJ/kg that was very high, the flame-proof reaction progressed at once, and the cross-section double structure was easily formed. Also, because the oxidation depth D of the film was 3.0 μm that was small and the oxygen permeability was low, which meant that the oxygen could not be diffused inside the precursor fiber having the large single-fiber fineness, the flame-proof treatment could not be given evenly and the formation of the cross-section double structure was prominent.

The cross-sectional shape of the carbon fiber obtained in Comparative Example 6 was the horsebean type having the diameter of 11.7 μm and the roundness of 0.82. However, the strand tensile strength and the strand tensile elastic modulus exhibited lower values than in Example 1. This is because, since the monomer unit such as the HEMA unit having the hydrophilic group was not contained in the copolymer that composes the precursor fiber, the water contact angle of the film was 76.2° that was very high and the compactness or the homogeneity of the precursor fiber bundle could not be kept. Further, because the copolymer H contains the IA unit, the heat quantity Ja is 178 kJ/kg that is large whereas the heat quantity Jb is 473 kJ/kg that is very small, and therefore the flame-proof treatment cannot be given evenly even when the treatment time is prolonged to 100 minutes.

The cross-sectional shape of the carbon fiber obtained in Comparative Example 7 was the horsebean type having the diameter of 12.3 μm and the roundness of 0.81. However, the strand tensile strength and the strand tensile elastic modulus exhibited lower values than in Example 1. This is because, since the monomer unit such as the HEMA unit having the hydrophilic group was not contained in the copolymer that composes the precursor fiber, the water contact angle of the film was 71.1° that was high and the compactness or the homogeneity of the precursor fiber bundle could not be kept. Further, because the copolymer 1 contains an MAA unit, the heat quantity Ja is 262 kJ/kg that is very high, the flame-proof reaction progresses at once, and thus the cross-section double structure is easily formed. Also, because the oxidation depth De of the film is 3.2 μm that is small, the oxygen permeability of the precursor fiber is low, which meant that the oxygen could not be diffused inside the precursor fiber having the large single fiber fineness and the flame-proof treatment could not be given evenly.

The cross-sectional shape of the carbon fiber obtained in Comparative Example 8 was the horsebean type having the diameter of 11.9 μm and the roundness of 0.83. However, the strand tensile strength and the strand tensile elastic modulus exhibited lower values than in Example 1. The followings seem to be causes for this. The compactness and the homogeneity of the precursor fiber are kept when the AAm unit is contained in the copolymer that composes the precursor fiber. But, since the site of the carboxyl group in the copolymer is not hydroxyalkylated, the heat quantity Ja is 82 kJ/kg that is very small, the precursor fiber is plasticized before the flame-proof reaction progresses, and the fiber is extended in the flame-proof step. In addition, the cross-section double structure is easily formed because the heat quantity Jb is 1098 kJ/kg that is high and the flame-proof reaction progresses at once. Also, because the monomer unit including the carboxylate group is not contained in the copolymer J whereas the bulky IBMA unit is introduced as the monomer unit, the oxidation depth De of the film is 6.3 μm that is large, the oxygen permeability of the precursor fiber is enough but the flame-proof reactivity is unsuitable, and therefore the flame-proof treatment cannot be given evenly.

The cross-sectional shape of the carbon fiber obtained in Comparative Example 9 was the horsebean type having the diameter of 7.1 μm and the roundness of 0.84. Further, the strand tensile strength and the strand tensile elastic modulus exhibited the similar values to those in Example 1, but the tow width that was the indicator for the fiber spreading was 20.9 mm that was the lowest in the all Examples of the present invention. This is because the single fiber fineness of the precursor fiber bundle is 1.0 dtex that is thin, and thus the single fibers are easily tangled with one another and the fiber spreading is reduced.

The strand tensile strength and the strand tensile elastic modulus of the carbon fibers obtained in Comparative Examples 10 to 14 are lower than those in Example 1. This is because the fiber cross-sectional shape of the precursor fiber is the round type, where the distance from the surface to the center of the cross-section of the fiber is long, and thus the flame-proof treatment cannot be given evenly.

Example 16

An acryl-based copolymer A containing 98.0 mol % of the AN unit and 2.0 mol % of the HEMA unit and having the specific viscosity of 0.21 produced in the same manner as in Example 1 was dissolved in dimethylacetamide to prepare a spinning neat solution where the polymer concentration was 21% and a neat solution temperature was 60° C. Threads were spun by the wet spinning method using this spinning neat solution. A coagulation bath into which the spinning neat solution is discharged is an aqueous solution of dimethylacetamide at a concentration of 45% by mass at temperature of 25° C. The number of holes in a spinning nozzle used is 3000. Coagulated threads obtained by coagulating in the coagulation bath were stretched with washing and stretched with heat to total 7.4 times to obtain a precursor fiber bundle A. A discharge amount was controlled so that the single-fiber fineness of the precursor fiber bundle A was 2.5 dtex. The calorific value obtained by the heat flux type differential scanning calorimeter was 3400 kJ/kg and the H-NMR half-value width was 12.5 kHz.

The flame-proof treatment was given to the precursor fiber bundle A by treating it in air heated at 230 to 270° C. at an extending rate of 2% for 70 minutes in the hot wind circulating flame-proof furnace to obtain a flame-proofed fiber bundle. The temperature in the flame-proof furnace was controlled so that the density of the flame-proofed fiber became about 1.35 g/cm$^3$ in 70 minutes. The density of the obtained flame-proofed fiber was 1.352 g/cm$^3$.

Subsequently, this flame-proofed fiber bundle was treated with heat at the highest temperature of 690° C. at an extending rate of 3.0% for one minute under a nitrogen atmosphere (pre-carbonization treatment), and further carbonized in a high temperature treatment furnace at the highest temperature of 1450° C. at an extending rate of −4.3% for one minute under a nitrogen atmosphere to obtain a carbon fiber bundle. The strand tensile strength and the strand tensile elastic modulus were 4390 MPa and 251 GPa, respectively that were high.

Example 17

The flame-proof treatment was given to the precursor fiber bundle A produced in the same manner as in Example 16 by treating it in the air heated at 230 to 270° C. at an extending rate of 2% for 90 minutes in the hot wind circulating flame-proof furnace. The temperature in the flame-proof furnace was controlled so that 1.40 g/cm$^3$ was obtained in 90 minutes. The density of the obtained flame-proofed fiber was 1.400.

Subsequently, the pre-carbonization treatment and the carbonization treatment were given in the same manner as in Example 16 to obtain a carbon fiber bundle. The strand tensile strength and the strand tensile elastic modulus were 4280 MPa and 260 GPa, respectively, that were high.

Examples 18 to 27 and Comparative Examples 15 to 19

A spinning neat solution was prepared and threads were spun to obtain precursor fiber bundles B to I in the same manner as in Example 16 except that the coagulation concentration and the coagulation temperature were values shown in Table 5 and the discharge amount was controlled so that the single-fiber fineness was the value shown in Table 5.

The single-fiber fineness, the calorific value obtained by the heat flux type differential scanning calorimeter, and the $^1$H-NMR half-value width in the obtained precursor fiber bundles are shown in Table 6.

Then, the flame-proof treatment was given to each of these precursor fiber bundles in the hot wind circulating flame-proof furnace under the condition in Example 16 or Example 17. The density of the obtained each flame-proofed fiber is shown in Table 6.

Further, the pre-carbonization treatment and the carbonization treatment were given to this flame-proofed fiber bundle in the same manner as in Example 16 or Example 17 to obtain a carbon fiber bundle. The strand tensile strength and the strand tensile elastic modulus of the obtained carbon fibers are shown in Table 6.

The carbon fibers obtained in Examples 18 to 27 exhibited the high values of the strand tensile strength and the strand tensile elastic modulus.

In Comparative Examples 15 and 16, the calorific value per unit mass is smaller than 3200 kJ/kg and thus the strand elastic modulus is smaller than that in Examples. In Comparative Examples 17 and 18, both the strand tensile strength and the strand tensile elastic modulus are good, but the single-fiber fineness is 1.5 dtex that is small. Thus, the objective carbon fiber bundle could not be obtained.

Example 28

A precursor fiber bundle J was obtained in the same manner as in Example 16, except that the copolymer B produced in the same manner as in Example 15, containing 98.5 mol % of the AN unit and 1.5 mol % of the HEMA unit and having the specific viscosity of 0.21 was used, the discharge amount was controlled so that the single-fiber fineness was 2.0 dtex, and the coagulation bath condition in Table 5 was used.

The flame-proof treatment was given to the precursor fiber bundle J by treating it in the heated air at 230 to 270° C. at an extending rate of 2% for 60 minutes in the hot wind circulating furnace to obtain a flame-proofed fiber bundle. The temperature in the flame-proof furnace was controlled so that the density of the flame-proofed fiber became about 1.35 g/cm$^3$ after treating for 60 minutes. After the flame-proof treatment, the pre-carbonization treatment and the subsequent carbonization treatment were performed under the same condition as in Example 16 to obtain a carbon fiber bundle. Evaluation results are shown in Table 6.

Comparative Examples 20 and 21

An acryl-based copolymer D containing 97.0 mol % of the AN unit, 2.6 mol % of the AAm unit and 0.4 mol % of a methacrylic acid unit and having the specific viscosity of 0.21 was used, a spinning neat solution was prepared and the discharge amount was controlled in the same manner as in Example 16, and the threads were spun under the coagulation bath condition shown in Table 5 to obtain precursor fiber bundles K and L. The single fiber fineness, the calorific value obtained by the heat flux type differential scanning calorimeter, and the $^1$H-NMR half-value width in the obtained precursor fiber bundles are shown in Table 6. And the flame-proof treatment was given to this flame-proofed fiber bundle by controlling the flame-proof temperature so that the density of the flame-proofed fiber became about 1.35 g/cm³ in 70 minutes, and subsequently the pre-carbonization treatment and the carbonization treatment were performed under the same condition as in Example 16 to obtain a carbon fiber bundle. Evaluation results are shown in Table 6.

In Comparative Example 20, the calorific value per unit mass is smaller than 3200 kJ/kg and the $^1$H-NMR half-value width is larger than 14.5 kHz. Thus the oxygen is not diffused sufficiently and there are few stable structures. Thus, both the strand tensile strength and the strand tensile elastic modulus were low.

In Comparative Example 21, the $^1$H-NMR half-value width is larger than 14.5 kHz. Thus, a diffusion rate of the oxygen is slow. However, the quantity of change to the stable structure upon the flame-proof treatment becomes large because the single fiber fineness is 1.5 dtex that is thin. Thus, the strand tensile strength and the strand tensile elastic modulus of the carbon fiber exhibited the high values. Meanwhile, the single fiber fineness is small. Thus the carbon fiber having the target thickness of the single fiber could not be obtained.

Figure 6:
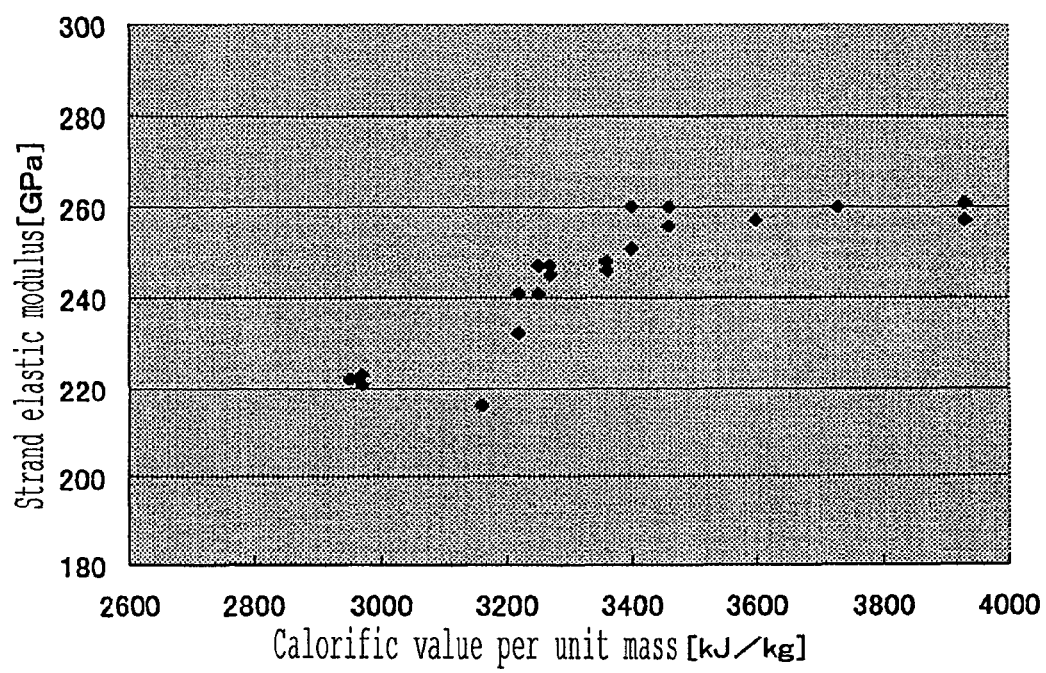
FIG. 6 is a view illustrating a relation between a strand elastic modulus and a calorific value per unit mass of the carbon fiber.

A relation between the strand elastic modulus and the calorific value per unit mass in Examples and Comparative Examples is shown in FIG. 6. It is evident that when the calorific value per unit mass is smaller than 3200 kJ/kg, the strand tensile elastic modulus is reduced and the physical property is reduced regardless of the copolymer composition and the single fiber fineness.

Example 29

Acrylonitrile and 2-hydroxyethyl methacrylate were copolymerized by aqueous suspension polymerization in the presence of ammonium persulfate/ammonium hydrogen sulfide and iron sulfate to obtain an acrylonitrile-based copolymer composed of acrylonitrile unit/2-hydroxyethyl methacrylate unit=98.5/1.5 (mol %). This copolymer was dissolved in dimethylacetamide to prepare a spinning neat solution at 21% by mass. The spinning neat solution was discharged into a coagulation bath composed of an aqueous solution of dimethylacetamide at a concentration of 60% by mass at temperature of 35° C. through a spinning nozzle having a hole number of 24,000 and a hole diameter of 60 μm, and a fiber bundle (swelled line of threads) was obtained by receiving at a velocity 0.32 times a discharge linear velocity from the surface of the spinning nozzle.

Then, this fiber bundle was washed with water simultaneously with stretching it to 5.4 times, further led to a first oil bath composed of an oil treatment solution in which an oil composition of amino-modified silicon/polyoxyethylene (6) lauryl ether=91/9 (mass ratio) was dispersed at a concentration of 1.5% by mass in water, and the oil treatment solution was imparted to the fiber bundle. Then, the oil treatment solution was once squeezed out at a guide, subsequently, the fiber bundle was led to a second oil bath composed of the same composition and concentration as in the first oil bath, and the oil treatment solution was imparted again to the fiber bundle.

The fiber bundle to which the oil treatment solution had been imparted again was dried using a heating roll, and stretched with dry heat to 1.34 times between the heating rolls in which a rotation speed was adjusted to a predetermined condition. A total stretching magnification from the swelled line of threads was 7.4 times. Subsequently, a water percentage is controlled by giving water to the fiber bundle at a touch roll to obtain a precursor fiber bundle having the single fiber fineness of 2.5 dtex.

The flame-proof treatment was given to this precursor fiber bundle by treating it in air heated at 220 to 260° C. at an extending rate of −1.5% for 70 minutes in the hot wind circulating flame-proof furnace to obtain a flame-proofed fiber bundle. The obtained flame-proofed fiber bundle was further pre-carbonized under the nitrogen atmosphere at 700° C. at an extending rate of +3% for 1.4 minutes, and subsequently carbonized under the nitrogen atmosphere at 1,300° C. at an extending rate of −4.0% for 1.0 minute to obtain a carbon fiber. Subsequently, after giving a surface treatment, a sizing agent obtained by mixing 80 parts by mass of "Epicoat 828" as a main base manufactured by Japan Epoxy Resin and 20 parts by mass of "Pluronic F88" as an emulsifier manufactured by Asahi Denka and preparing a water dispersion solution by phase transfer emulsification was adhered at 1% by mass thereto, and a drying treatment was given thereto to obtain a carbon fiber bundle.

The single fiber fineness of the obtained carbon fiber bundle was 1.3 dtex. The strand strength and the strand elastic modulus were 4300 MPa and 233 GPa, respectively. The roundness of the cross-section and the depth of the wrinkle in this carbon fiber were 0.75 and 49.8 nm, respectively. The impregnation was evaluated, and the elevation height was 126 mm. The VaRTM processing was performed and the impregnation with the resin was evaluated, and the impregnation time was 9 minutes and the impregnation was good. The evaluation results are summarized in Table 7.

Example 30

A carbon fiber bundle was obtained in the same manner as in Example 29, except that acrylonitrile and 2-hydroxyethyl methacrylate were copolymerized by aqueous suspension polymerization in the presence of ammonium persulfate/ammonium hydrogen sulfide and iron sulfate to obtain an acrylonitrile-based copolymer composed of acrylonitrile unit/2-hydroxyethyl methacrylate unit-98.0/2.0 (mol %).

The single fiber fineness of the obtained carbon fiber bundle was 1.3 dtex. Strand physical properties were measured. The strand strength and the strand elastic modulus were 4.2 GPa and 232 GPa, respectively. The roundness of the cross-section and the depth of the wrinkle in this carbon fiber were 0.75 and 50.0 nm, respectively. The impregnation was evaluated, and the elevation height was 125 mm. The VaRTM processing was performed and the impregnation with the resin was evaluated, and the impregnation time was 9 minutes and the impregnation was good.

Comparative Example 22

A precursor fiber bundle having the single fiber fineness of 4.5 dtex was obtained in the same manner as in Example 29, except the spinning condition shown in Table 7.

The flame-proof treatment was given to this precursor fiber bundle by treating it in air heated at 220 to 260° C. at an extending rate of −5.9% for 70 minutes in the hot wind circulating flame-proof furnace to obtain a flame-proofed fiber bundle. It was tried to further pre-carbonize the obtained flame-proofed fiber bundle under the nitrogen atmosphere at 700° C. at an extending rate of +3%, but many broken threads were produced in the pre-carbonization step probably due to shortage of the flame-proof treatment. Thus, the flame-proof treatment was performed at an extending rate of −5.9% for 300 minutes, and the fiber bundle could pass through the pre-carbonization step without the broken thread. Subsequently, the fiber bundle was carbonized under the nitrogen atmosphere at 1,300° C. at an extending rate of −4.0% for 3.2 minutes to obtain a carbon fiber bundle. A carbon fiber bundle was obtained in the same manner as in Example 29, except for above conditions. Each evaluation result is shown in Table 7.

Comparative Example 23

Acrylonitrile, acrylamide and methacrylic acid were copolymerized by aqueous suspension polymerization in the presence of ammonium persulfate/ammonium hydrogen sulfide and iron sulfate to obtain an acrylonitrile-based copolymer composed of acrylonitrile unit/acrylamide unit/methacrylic acid unit=96/3/1 (mol %). Using this copolymer, the preparation of a spinning neat solution, spinning, washing with water, stretching, and the treatment with the oil agent were performed in the same manner as in Example 29 to impart the oil treatment solution to the fiber bundle.

The fiber bundle to which the oil treatment solution had been imparted again was dried using the heating roll, and stretched with dry heat to 1.3 times between the heating rolls in which the rotation speed was adjusted to the predetermined condition. A total stretching magnification from the swelled line of threads was 7.3 times. Subsequently, the water percentage is controlled by giving water to the fiber bundle at the touch roll to obtain a precursor fiber bundle having the single fiber fineness of 2.5 dtex.

The flame-proof treatment was given to the above precursor fiber bundle by treating it in air heated at 220 to 260° C. at an extending rate of −5.9% for 70 minutes in the hot wind circulating flame-proof furnace to obtain a flame-proofed fiber bundle. It was tried to further pre-carbonize the obtained flame-proofed fiber bundle under the nitrogen atmosphere at 700° C. at an extending rate of +3%, but many broken threads were produced in the pre-carbonization step probably due to shortage of the flame-proof treatment. Thus, the flame-proof treatment was performed at an extending rate of −5.9% for 300 minutes, and the fiber bundle could pass through the pre-carbonization step without the broken thread. Subsequently, the fiber bundle was carbonized under the nitrogen atmosphere at 1,300° C. at an extending rate of −4.0% for 3.2 minutes to obtain a carbon fiber bundle. A carbon fiber bundle was obtained in the same manner as in Example 29, except for above conditions, and the evaluation results in Table 7 were obtained.

Comparative Example 24

A PAN-based precursor fiber bundle having the single fiber fineness of 1.0 dtex was obtained and further the carbon fiber was produced in the same manner as in Example 29, except for the spinning condition shown in Table 7, and the evaluation results in Table 7 were obtained.

Comparative Example 25

A fiber bundle (swelled line of threads) was obtained by employing the spinning condition shown in Table 7. Then, this fiber bundle was washed with water simultaneously with stretching to 4.8 times, and the oil treatment solution was imparted to the fiber bundle in the same manner as in Example 29. This fiber bundle was dried using the heating roll, and stretched to 2.7 times with steam using a steam stretching machine. At this time, the total stretching magnification from the swelled line of threads was 12.7 times. A precursor fiber bundle having the single fiber fineness of 1.2 dtex was obtained in the same manner as in Example 29, except for above conditions.

The flame-proof treatment was given to this precursor fiber bundle by treating it in air heated at 220 to 260° C. at an extending rate of −6.0% for 60 minutes in the hot wind circulating flame-proof furnace to obtain a flame-proofed fiber bundle. The obtained flame-proofed fiber bundle was pre-carbonized under the nitrogen atmosphere at 700° C. at an extending rate of +3% for 1.6 minutes, and subsequently carbonized under the nitrogen atmosphere at 1,250° C. at an extending rate of −4.6% for 1.4 minutes to obtain a carbon fiber. A carbon fiber bundle was obtained in the same manner as in Example 29, except for above conditions. And, the evaluation results in Table 7 were obtained.

Comparative Example 26

A fiber bundle (swelled line of threads) was obtained by employing the spinning condition shown in Table 7. Then, this fiber bundle was washed with water simultaneously with stretching to 5.9 times, and the oil treatment solution was imparted to the fiber bundle in the same manner as in Example 29. This fiber bundle was dried using the heating roll, and stretched to 2.1 times with steam using the steam stretching machine. At this time, the total stretching magnification from the swelled line of threads was 12.5 times. A precursor fiber bundle having the single fiber fineness of 1.2 dtex was obtained in the same manner as in Example 29, except for above conditions.

A carbon fiber was produced using this precursor fiber bundle in the same manner as in Comparative Example 23, and the evaluation results in Table 7 were obtained.

Comparative Example 27

A precursor fiber bundle having the single fiber fineness of 2.5 dtex was obtained in the same manner as in Example 29, except for the spinning condition shown in Table 7. It was tried to produce a carbon fiber using this precursor fiber bundle in the same manner as in Example 29, but the bundle integrity of the fiber bundle was reduced, the passing property through the burning step when the carbon fiber bundle was produced was deteriorated, and the carbon fiber bundle could not be produced stably.

Examples 31 and 32 and Comparative Examples 28 to 30

1. Raw Materials

The followings were used as raw materials in the following Examples and Comparative Examples.

(1-1. Carbon Fiber)

PAN-based carbon fiber 1 (single fiber fineness: 0.75 dtex, roundness: 0.70, diameter Di: 8.4 μm, strength: 4116 MPa, elastic modulus: 235 GPa)

PAN-based carbon fiber 2 (single fiber fineness: 1.24 dtex, roundness: 0.75, diameter Di: 11.9 μm, strength: 4226 MPa, elastic modulus: 229 GPa)

PAN-based carbon fiber 3 (single fiber fineness: 2.01 dtex, roundness: 0.73, diameter Di: 15.6 μm, strength: 3489 MPa, elastic modulus: 246 GPa)

PAN-based carbon fiber 4 (single fiber fineness: 1.21 dtex, roundness: 0.95, diameter Di: 9.6 μm, strength: 3989 MPa, elastic modulus: 227 GPa)

PAN-based carbon fiber 5 (single fiber fineness: 2.29 dtex, roundness: 0.95, diameter Di: 11.9 μm, strength: 3283 MPa, elastic modulus: 232 GPa)

The PAN-based carbon fiber 1 was produced under the same condition as in Comparative Example 1, except that the number of filaments was changed to 50000. The PAN-based carbon fiber 2 was produced under the same condition as in Example 3. The PAN-based carbon fiber 3 was produced under the same condition as in Example 15, except that the number of filaments was changed to 12000. The PAN-based carbon fiber 4 was produced under the same condition as in Comparative Example 12. The PAN-based carbon fiber 5 was produced under the same condition as in Comparative Example 14, except that the number of filaments was changed to 12000 and the fineness of the carbon fiber precursor was changed to 4.5 dtex.

(1-2. Epoxy Resin)

jER828: Liquid bisphenol A-type epoxy resin (manufactured by Mitsubishi Chemical Corporation)

AER4152: Oxazolidone-type epoxy resin (manufactured by Asahi Kasei Corporation)

(1-3. Thermoplastic Resin)

Vinylec E: polyvinyl formal resin (manufactured by Chisso Corporation)

(1-4. Curing Aid)

DCMU: urea compound DCMU 99 (manufactured by Hodogaya Chemical Co., Ltd.)

PDMU: urea compound Omicure 94 (manufactured by PTI Japan).

(1-5. Curing Agent)

DICY: dicyandiamide DICY 15 (manufactured by Mitsubishi Chemical Corporation)

2. Production and Evaluation

The following production condition and evaluation condition were employed in the following Examples and Comparative Examples.

(2-1. Preparation of Epoxy Resin Composition)

The epoxy resin and the thermoplastic resin in predetermined amounts were added in a kneader, kneaded while the temperature was raised up to 160° C., and kneaded at 160° C. for one hour to obtain a clear viscous solution. The temperature was lowered down to 60° C. while the solution is kneaded, and the curing aid and the curing agent in predetermined amounts were added and kneaded to obtain an epoxy resin composition. The composition of this epoxy resin composition is shown in Table 8.

(2-2. Measurement of Flow Index)

The flow index was measured by the method described previously.

(2-3. Preparation of Resin Film)

The epoxy resin composition obtained by the above preparation of the epoxy resin composition was applied onto mold-releasing paper at a resin weight per unit of 50 to 55 g/m$^2$ at 60° C. using a film coater to obtain a "resin film T".

(2-4. Preparation of Carbon Fiber Prepreg)

A unidirectional prepreg in which the weight per unit of the carbon fiber was 202 to 213 g/m$^2$ and a resin content rate was 32.0 to 34.3% by mass was obtained by twisting each carbon fiber bundle (any of the PAN-based carbon fiber bubbles 1 to 5) on the resin-applied surface of the resin film T using a drum wind, placing another resin film T thereon so that the applied surface faced downward to sandwich the carbon fiber bundle, and impregnating between the fibers of the carbon fiber bundle with the resin. The evaluation results are shown in Table 9.

(2-5. Formation of Composite Panel (6 Ply))

The obtained unidirectional prepreg was cut into a size of a length (0° direction, direction parallel to the fiber) of 300 mm and a width (90° direction, direction perpendicular to the fiber) of 300 mm. Six prepregs were laminated with adjusting to the 0° direction and bagged, and then a vacuum bag was formed under a curing condition in FIG. 6 using an oven to obtain a composite panel. The evaluation results are shown in Table 9.

(2-6. Formation of Composite Panel (10 Ply))

The obtained unidirectional prepreg was cut into the size of the length (0° direction, direction parallel to the fiber) of 300 mm and the width (90° direction, direction perpendicular to the fiber) of 300 mm. Ten prepregs were laminated with adjusting to the 0° direction and bagged, and then a vacuum bag was formed under a curing condition in FIG. 5 using an oven to obtain a composite panel.

(2-7. 0° Compression Test)

A test piece was made by adhering a tab formed from the same material as in the composite panel to the composite panel obtained above and then cutting it into a dimension of a length (0° direction) of 80 mm and a width of 12.7 mm using a wet diamond cutter. A 0° compression test was performed in the obtained test piece using an all-round tester Instron 5882 manufactured by Instron and analysis software Bluehill in accordance with SACMA 1R-94 to calculate a 0° compression strength and an elastic modulus. The evaluation results are shown in Table 9.

(2-8. 0° Bending Test)

A test piece was made by cutting the composite panel (10 ply) obtained above into a dimension of a length (0° direction) of 127 mm and a width (90° direction) of 12.7 mm using the wet diamond cutter. A three-point bending test was performed in the obtained test piece using an all-round tester Instron 5565 manufactured by Instron and analysis software Bluehill in accordance with ASTM D-790 (indenter R=5.0, L/D=40, crosshead speed: 5.26 to 5.22 mm/minute) to calculate a 0° bending strength and a 0° bending elastic modulus. The evaluation results are shown in Table 9.

(2-9. 90° Bending Test)

A test piece was made by cutting the composite panel (10 ply) obtained above into a dimension of a length (0° direction) of 25.4 mm and a width (90° direction) of 50 mm using the wet diamond cutter. A three-point bending test was performed in the obtained test piece using the all-round tester Instron 5565 manufactured by Instron and analysis software Bluehill in accordance with ASTM D-790 (indenter R=3.2, L/D=16, crosshead speed: 0.838 to 0.902 mm/minute) to calculate a 90° bending strength and a 90° bending elastic modulus. The evaluation results are shown in Table 9.

(2-10. Interlayer Shearing Test)

A test piece was made from the composite panel (10 ply) obtained above using the wet diamond cutter, and an interlayer shearing strength was measured in accordance with ASTM D-2344. The evaluation results are shown in Table 9.

Example 31

The "PAN-based carbon fiber 2" having the fineness of 1.24 dtex was used. Both the strength and the elastic modulus exhibited the high values in the 0° compression test. A strength retention rate of the strength in the 10 ply composite panel relative to the strength in the 6 ply composite panel (=10 ply panel strength/6 ply panel strength× 100) in the 0° compression test exhibited a high value (97.6%).

Example 32

The "PAN-based carbon fiber 3" having the fineness of 2.01 dtex was used. Both the strength and the elastic modulus exhibited the high values in the 0° compression test. The strength retention rate of the strength in the 10 ply composite panel relative to the strength in the 6 ply composite panel in the 0° compression test exhibited a high value (98.7%).

Comparative Example 28

The "PAN-based carbon fiber 4" having the fineness of 1.21 dtex was used. The strength of the 6 ply composite panel was lower than that in Example 31 in the 0° compression test, and this strength was not at usable level.

Comparative Example 29

The "PAN-based carbon fiber 5" having the fineness of 2.29 dtex was used. The strength of the 6 ply composite panel was lower than that in Example 32 in the 0° compression test, and this strength was not at usable level.

Comparative Example 30

The "PAN-based carbon fiber 1" having the fineness of 0.75 dtex was used. The strength of the 10 ply composite panel was lower than that in Example 32 in the 0° compression test, and this strength was not at usable level. The strength retention rate of the strength in the 10 ply composite panel relative to the strength in the 6 ply composite panel in the 0° compression test exhibited a low value (82.5%).

Comparative Example 31

This Comparative Example is an example in which the resin viscosity in Comparative Example 30 was increased. The flow index was reduced to 1941 $Pa^{-1}$, the strength of the 10 ply composite panel exhibited the low value, the strength retention rate of the strength in the 10 ply composite panel relative to the strength in the 6 ply composite panel in the 0° compression test was slightly enhanced, but the strength retention rate exhibited the low value (87.1%).

Comparative Example 32

This Comparative Example is an example in which the curing rate in Comparative Example 30 was increased. The flow index was reduced to 2123 $Pa^{-1}$, the strength of the 10 ply composite panel exhibited the low value, the strength retention rate of the strength in the 10 ply composite panel relative to the strength in the 6 ply composite panel in the 0° compression test was slightly enhanced, but the strength retention rate exhibited the low value (88.0%).

According to the present invention, it is possible to evenly treat the precursor fiber bundle having the large single-fiber fineness and the excellent productivity without reducing the productivity in the flame-proof treatment step, and further it is possible to obtain the carbon fiber bundle with high quality containing few interlaced single fibers in the fiber bundle and having the excellent spreadability.

TABLE 1

| | | | Example 1 | Example 2 | Example 3 | Example 4 | Example 5 | Example 6 | Example 7 | Example 8 |
|---|---|---|---|---|---|---|---|---|---|---|
| Monomer supply composition ratio | Copolymer | | Copolymer A | Copolymer C | Copolymer A | Copolymer F | Copolymer A | Copolymer G | Copolymer G | Copolymer G |
| | AN | Mol % | 98.7 | 98.8 | 98.7 | 98.4 | 98.7 | 98.3 | 98.3 | 98.3 |
| | HEMA | Mol % | 1.3 | — | 1.3 | — | 1.3 | 1.7 | 1.7 | 1.7 |
| | HPMA | Mol % | — | 1.2 | — | — | — | — | — | — |
| | HEA | Mol % | — | — | — | 1.6 | — | — | — | — |
| | AAm | Mol % | — | — | — | — | — | — | — | — |
| | MAA | Mol % | — | — | — | — | — | — | — | — |
| | IBMA | Mol % | — | — | — | — | — | — | — | — |
| Water/monomer | | Mass ratio | 3.0 | 3.0 | 3.0 | 3.0 | 3.0 | 3 | 3 | 3 |
| Copolymer composition ratio | AN | Mol % | 98.5 | 98.8 | 98.5 | 98.5 | 98.5 | 98.0 | 98.0 | 98.0 |
| | HEMA | Mol % | 1.5 | — | 1.5 | — | 1.5 | 2.0 | 2.0 | 2.0 |
| | HPMA | Mol % | — | 1.2 | — | — | — | — | — | — |
| | HEA | Mol % | — | — | — | 1.5 | — | — | — | — |
| | AAm | Mol % | — | — | — | — | — | — | — | — |
| | MAA | Mol % | — | — | — | — | — | — | — | — |
| | IBMA | Mol % | — | — | — | — | — | — | — | — |
| Copolymer characteristics | Specific viscosity ηsp | — | 0.21 | 0.21 | 0.21 | 0.21 | 0.21 | 0.22 | 0.22 | 0.22 |
| | Melting point under heat and humidity | °C. | 170 | 172 | 170 | 170 | 170 | 168 | 168 | 168 |
| | Film Water contact angle | ° | 62.3 | 62.8 | 62.3 | 62.5 | 62.3 | 58.0 | 58.0 | 58.0 |
| | Oxidation depth | μm | 4.5 | 4.5 | 4.5 | 4.5 | 4.5 | 4.7 | 4.7 | 4.7 |
| Precursor fiber bundle | Single fiber fineness | dtex | 2.0 | 2.0 | 2.5 | 2.5 | 3.0 | 2.5 | 2.5 | 2.5 |
| | Filament number | Number | 30000 | 30000 | 24000 | 24000 | 20000 | 24000 | 24000 | 24000 |
| | Fiber density | g/cm³ | 1.180 | 1.180 | 1.180 | 1.180 | 1.180 | 1.180 | 1.180 | 1.180 |
| | Spinning bath concentration | wt % | 60 | 60 | 60 | 60 | 60 | 60 | 50 | 50 |
| | Spinning bath temperature | °C. | 35 | 35 | 35 | 35 | 35 | 35 | 40 | 35 |
| | Roundness | — | 0.85 | 0.86 | 0.83 | 0.82 | 0.82 | 0.90 | 0.88 | 0.86 |
| | Cross-sectional shape | — | Horsebean | Horsebean | Horsebean | Horsebean | Horsebean | Horsebean | Horsebean | Horsebean |
| | Heat flux differential scanning calorimeter | Heat quantity Ja | kJ/kg | 185 | 183 | 177 | 187 | 163 | 168 | 168 | 170 |
| | | Heat quantity Jb | kJ/kg | 740 | 780 | 732 | 825 | 715 | 722 | 720 | 725 |
| Flame-proof treatment | Treatment time | min | 60 | 60 | 60 | 60 | 90 | 90 | 90 | 70 |
| | Temperature | °C. | 250–290 | 250–290 | 250–290 | 250–290 | 250–290 | 240–270 | 240–270 | 240–260 |
| | Extending rate | % | +2 | +2 | +2 | +2 | +2 | +2 | +2 | +2 |
| | Flame-proofed fiber density | g/cm³ | 1.392 | 1.391 | 1.406 | 1.395 | 1.398 | 1.397 | 1.400 | 1.351 |
| Carbon fiber bundle | Single fiber fineness | dtex | 1.07 | 1.06 | 1.36 | 1.34 | 1.61 | 1.34 | 1.35 | 1.25 |
| | Diameter Di | μm | 9.43 | 9.45 | 10.9 | 10.84 | 11.21 | 10.87 | 11.27 | 11.42 |
| | Roundness | — | 0.84 | 0.85 | 0.82 | 0.81 | 0.83 | 0.88 | 0.85 | 0.83 |
| | Fiber spreading | mm | 23.3 | 23.4 | 26 | 26.2 | 28.8 | 28.7 | 27.8 | 27.6 |
| | Strand strength | MPa | 4300 | 4250 | 3970 | 4100 | 3800 | 4240 | 4270 | 4350 |
| | Strand elastic modulus | GPa | 245 | 240 | 245 | 240 | 240 | 250 | 245 | 239 |

TABLE 2

| | | | Example 9 | Example 10 | Example 11 | Example 12 | Example 13 | Example 14 | Example 15 |
|---|---|---|---|---|---|---|---|---|---|
| Monomer supply composition ratio | Copolymer | | Copolymer G | Copolymer G | Copolymer G | Copolymer G | Copolymer G | Copolymer A | Copolymer B |
| | AN | Mol % | 98.3 | 98.3 | 98.3 | 98.3 | 98.3 | 98.7 | 97.9 |
| | HEMA | Mol % | 1.7 | 1.7 | 1.7 | 1.7 | 1.7 | 1.3 | 2.1 |
| | HPMA | Mol % | — | — | — | — | — | — | — |
| | HEA | Mol % | — | — | — | — | — | — | — |
| | AAm | Mol % | — | — | — | — | — | — | — |
| | MAA | Mol % | — | — | — | — | — | — | — |
| | IBMA | Mol % | — | — | — | — | — | — | — |
| Water/monomer | | Mass ratio | 3 | 3 | 3 | 3 | 3 | 3.0 | 3.0 |
| Copolymer composition ratio | AN | Mol % | 98.0 | 98.0 | 98.0 | 98.0 | 98.0 | 98.5 | 97.5 |
| | HEMA | Mol % | 2.0 | 2.0 | 2.0 | 2.0 | 2.0 | 1.5 | 2.5 |
| | HPMA | Mol % | — | — | — | — | — | — | — |
| | HEA | Mol % | — | — | — | — | — | — | — |
| | AAm | Mol % | — | — | — | — | — | — | — |
| | MAA | Mol % | — | — | — | — | — | — | — |
| | IBMA | Mol % | — | — | — | — | — | — | — |
| Copolymer characteristics | Specific viscosity ηsp | — | 0.22 | 0.22 | 0.22 | 0.22 | 0.22 | 0.21 | 0.21 |
| | Melting point under heat and humidity | °C. | 168 | 168 | 168 | 168 | 168 | 170 | 165 |
| | Film Water contact angle | ° | 58.0 | 58.0 | 58.0 | 58.0 | 58.0 | 62.3 | 53 |
| | Oxidation depth | μm | 4.7 | 4.7 | 4.7 | 4.7 | 4.7 | 4.5 | 4.9 |
| Precursor fiber bundle | Single fiber fineness | dtex | 2.5 | 2.5 | 2.5 | 2.5 | 3.0 | 4.0 | 4.5 |
| | Filament number | Number | 24000 | 24000 | 24000 | 24000 | 20000 | 15000 | 15000 |
| | Fiber density | g/cm³ | 1.180 | 1.180 | 1.180 | 1.180 | 1.180 | 1.180 | 1.181 |
| | Spinning bath concentration | wt % | 45 | 45 | 45 | 30 | 45 | 40 | 45 |
| | Spinning bath temperature | °C. | 45 | 35 | 25 | 35 | 35 | 35 | 35 |
| | Roundness | — | 0.90 | 0.84 | 0.83 | 0.82 | 0.85 | 0.83 | 0.86 |
| | Cross-sectional shape | — | Horsebean | Horsebean | Horsebean | Horsebean | Horsebean | Horsebean | Horsebean |
| | Heat flux type differential scanning calorimeter | Heat quantity Ja | kJ/kg | 170 | 172 | 175 | 177 | 174 | 187 | 190 |
| | | Heat quantity Jb | kJ/kg | 724 | 730 | 740 | 733 | 721 | 745 | 758 |
| Flame-proof treatment | Treatment time | min | 70 | 70 | 90 | 90 | 70 | 90 | 90 |
| | Temperature | °C. | 240~260 | 240~260 | 240~270 | 240~270 | 240~260 | 250~290 | 250~290 |
| | Extending rate | % | +2 | +2 | +2 | +2 | +2 | +2 | +2 |
| | Flame-proofed fiber density | g/cm³ | 1.355 | 1.352 | 1.402 | 1.405 | 1.354 | 1.360 | 1.360 |
| Carbon fiber bundle | Single fiber fineness | dtex | 1.26 | 1.25 | 1.35 | 1.36 | 1.50 | 2.03 | 2.28 |
| | Diameter Di | μm | 11.54 | 11.88 | 12.31 | 12.38 | 12.27 | 12.35 | 15.62 |
| | Roundness | — | 0.87 | 0.82 | 0.79 | 0.78 | 0.82 | 0.80 | 0.83 |
| | Fiber spreading | mm | 28.1 | 30.8 | 32.0 | 31.8 | 34.0 | 42.5 | 43.9 |
| | Strand strength | MPa | 4160 | 4150 | 4100 | 4100 | 4210 | 3700 | 3600 |
| | Strand elastic modulus | GPa | 241 | 249 | 251 | 255 | 242 | 235 | 232 |

TABLE 3

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
|  | Copolymer |  | Copolymer A | Copolymer D | Copolymer E | Copolymer E | Copolymer E | Copolymer H | Copolymer I |
| Monomer supply composition ratio | AN | Mol % | 98.7 | 98.5 | 97.0 | 97.0 | 97.0 | 98.2 | 98.1 |
|  | HEMA | Mol % | 1.3 | — | — | — | — | — | — |
|  | AAm | Mol % | — | — | 2.6 | 2.6 | 2.6 | — | — |
|  | MAA | Mol % | — | — | 0.4 | 0.4 | 0.4 | — | — |
|  | IA | Mol % | — | — | — | — | — | 0.7 | 0.5 |
|  | IBMA | Mol % | — | 1.5 | — | — | — | 1.1 | — |
|  | MMA | Mol % | — | — | — | — | — | — | 1.4 |
|  | Water/monomer | Mass ratio | 3.0 | 3.0 | 3.0 | 3.0 | 3.0 | 3.0 | 3.0 |
| Copolymer composition ratio | AN | Mol % | 98.5 | 97.3 | 97.5 | 97.5 | 97.5 | 97.7 | 97.5 |
|  | HEMA | Mol % | 1.5 | — | — | — | — | — | — |
|  | AAm | Mol % | — | — | 2.0 | 2.0 | 2.0 | — | — |
|  | MAA | Mol % | — | — | 0.5 | 0.5 | 0.5 | — | 0.7 |
|  | IA | Mol % | — | — | — | — | — | 0.8 | — |
|  | IBMA | Mol % | — | 2.7 | — | — | — | 1.5 | — |
|  | MMA | Mol % | — | — | — | — | — | — | 1.8 |
| Copolymer characteristics | Specific viscosity ηap | — | 0.21 | 0.21 | 0.21 | 0.21 | 0.21 | 0.22 | 0.20 |
|  | Melting point under heat and humidity | °C. | 170 | 158 | 168 | 168 | 168 | 170 | 160 |
|  | Film Water contact angle | ° | 62.3 | 74.4 | 58.1 | 58.1 | 58.1 | 76.2 | 71.1 |
|  | Oxidation depth | μm | 4.5 | 6.4 | 3.0 | 3.0 | 3.0 | 4.5 | 32 |
| Precursor fiber bundle | Single fiber fineness | dtex | 1.5 | 2.0 | 2.0 | 2.5 | 4 | 2.5 | 3.0 |
|  | Filament number | Number | 40000 | 30000 | 30000 | 24000 | 15000 | 24000 | 20000 |
|  | Fiber density | g/cm³ | 1.180 | 1.176 | 1.180 | 1.18 | 1.18 | 1.18 | 1.18 |
|  | Spinning bath concentration | wt % | 67 | 60 | 60 | 45 | 45 | 45 | 45 |
|  | Spinning bath temperature | °C. | 45 | 35 | 35 | 35 | 35 | 35 | 35 |
|  | Roundness | — | 0.94 | 0.86 | 0.85 | 0.83 | 0.81 | 0.84 | 0.82 |
|  | Cross-sectional shape | — | Round | Horsebean | Horsebean | Horsebean | Horsebean | Horsebean | Horsebean |
|  | Heat flux type differential scanning calorimeter | Heat quantity Ja | kJ/kg | 185 | 52 | 190 | 190 | 190 | 178 | 262 |
|  |  | Heat quantity Jb | kJ/kg | 743 | 340 | 1150 | 1151 | 1151 | 473 | 512 |
| Flame-proof treatment | Treatment time | Minute | 30 | 60 | 60 | 60 | 100 | 100 | 70 |
|  | Temperature | °C. | 250~290 | 250~290 | 230~270 | 230~270 | 210~240 | 210~290 | 230~260 |
|  | Density of flame-proofed fiber | g/cm³ | 1.419 | 1.392 | 1.405 | 1.396 | 1.350 | 1.352 | 1.351 |
| Carbon fiber bundle | Single fiber fineness | dtex | 0.82 | 1.07 | 1.09 | 1.35 | 1.99 | 1.25 | 1.71 |
|  | Diameter Di | μm | 7.6 | 9.4 | 9.4 | 11.9 | Cannot be sampled | 11.7 | 12.3 |
|  | Roundness | — | 0.95 | 0.85 | 0.81 | 0.82 |  | 0.82 | 0.81 |
|  | Fiber spreading | mm | 20.0 | 23.3 | 23.4 | 30.8 |  | 30.1 | 34.0 |
|  | Strand strength | MPa | 1910 | 2450 | 3100 | 3700 |  | 2800 | 3200 |
|  | Strand elastic modulus | GPa | 222 | 198 | 215 | 210 |  | 195 | 205 |

TABLE 4

|  |  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
|  | Copolymer |  | Copolymer J | Copolymer G | Copolymer B | Copolymer B | Copolymer G | Copolymer G | Copolymer G |
| Monomer supply composition ratio | AN | Mol % | 95.5 | 98.3 | 97.9 | 97.9 | 98.3 | 98.3 | 98.3 |
|  | HEMA | Mol % | — | 1.7 | 2.1 | 2.1 | 1.7 | 1.7 | 1.7 |
|  | AAm | Mol % | 2.5 | — | — | — | — | — | — |
|  | MAA | Mol % | — | — | — | — | — | — | — |
|  | IA | Mol % | — | — | — | — | — | — | — |
|  | IBMA | Mol % | 2 | — | — | — | — | — | — |
|  | MMA | Mol % | — | — | — | — | — | — | — |
|  | Water/monomer | Mass ratio | 3.0 | 3.0 | 3.0 | 3.0 | 3.0 | 3.0 | 3.0 |
| Copolymer composition ratio | AN | Mol % | 95.5 | 98.0 | 97.5 | 97.5 | 98.0 | 98.0 | 98.0 |
|  | HEMA | Mol % | — | 2.0 | 2.5 | 2.5 | 2.0 | 2.0 | 2.0 |
|  | AAm | Mol % | 2.0 | — | — | — | — | — | — |
|  | MAA | Mol % | — | — | — | — | — | — | — |
|  | IA | Mol % | — | — | — | — | — | — | — |
|  | IBMA | Mol % | 2.5 | — | — | — | — | — | — |
|  | MMA | Mol % | — | — | — | — | — | — | — |

TABLE 4-continued

|  |  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Copolymer characteristics | Specific viscosity ηap | — | 0.21 | 0.22 | 0.21 | 0.21 | 0.22 | 0.22 | 0.22 |
|  | Melting point under heat and humidity | ° C. | 155 | 158 | 165 | 165 | 168 | 168 | 168 |
|  | Film Water contact angle | ° | 56.2 | 58.0 | 53.0 | 53.0 | 58.0 | 58.0 | 58.0 |
|  | Oxidation depth | μm | 6.3 | 4.7 | 4.9 | 4.9 | 4.7 | 4.7 | 4.7 |
| Precursor fiber bundle | Single fiber fineness | dtex | 2.5 | 1.0 | 2.0 | 2.5 | 2.5 | 3.0 | 4.0 |
|  | Filament number | Number | 24000 | 50000 | 30000 | 24000 | 24000 | 20000 | 15000 |
|  | Fiber density | g/cm³ | 1.18 | 1.180 | 1.180 | 1.181 | 1.180 | 1.180 | 1.180 |
|  | Spinning bath concentration | wt % | 45 | 45 | 67 | 67 | 67 | 67 | 67 |
|  | Spinning bath temperature | ° C. | 35 | 35 | 45 | 45 | 35 | 45 | 45 |
|  | Roundness | — | 0.85 | 0.85 | 0.97 | 0.98 | 0.95 | 0.98 | 0.98 |
|  | Cross-sectional shape | — | Horsebean | Horsebean | Round | Round | Round | Round | Round |
|  | Heat flux type differential scanning calorimeter | Heat quantity Ja | kJ/kg | 82 | 170 | 183 | 186 | 163 | 159 | 157 |
|  |  | Heat quantity Jb | kJ/kg | 1098 | 718 | 740 | 750 | 710 | 698 | 694 |
| Flame-proof treatment | Treatment time | Minute | 90 | 70 | 60 | 60 | 70 | 70 | 70 |
|  | Temperature | ° C. | 240~270 | 240~260 | 250~290 | 250~290 | 240~260 | 240~250 | 240~260 |
|  | Density of flame-proofed fiber | g/cm³ | 1.402 | 1.362 | 1.352 | 1.398 | 1.352 | 1.351 | 1.354 |
| Carbon fiber bundle | Single fiber fineness | dtex | 1.35 | 0.51 | 1.00 | 1.35 | 1.25 | 1.50 | 2.01 |
|  | Diameter Di | μm | 11.9 | 7.1 | 7.9 | 9.6 | 10.2 | 10.4 | 11.6 |
|  | Roundness | — | 0.83 | 0.84 | 0.96 | 0.95 | 0.91 | 0.96 | 0.95 |
|  | Fiber spreading | mm | 30.5 | 20.9 | 21.2 | 25.2 | 25.5 | 28.3 | 33.9 |
|  | Strand strength | MPa | 3510 | 4350 | 3540 | 3150 | 2800 | 2400 | 2250 |
|  | Strand elastic modulus | GPa | 210 | 262 | 210 | 210 | 226 | 190 | 175 |

TABLE 5

| Precursor fiber bundle | Acryl-based copolymer | Acryl-based copolymer composition | Solidification bath concentration [Mass %] | Solidification bath temperature [° C.] | Single fiber fineness of precursor fiber bundle [dtex] |
|---|---|---|---|---|---|
| A | A | AN/HEMA (HEMA2 Mol %) | 45 | 35 | 2.5 |
| B |  |  | 67 | 45 | 2.5 |
| C |  |  | 67 | 35 | 2.5 |
| D |  |  | 45 | 45 | 2.5 |
| E |  |  | 45 | 25 | 2.5 |
| F |  |  | 60 | 35 | 3 |
| G |  |  | 45 | 35 | 3 |
| H |  |  | 45 | 35 | 1.5 |
| I |  |  | 40 | 35 | 4 |
| J | B | AN/HEMA (HEMA1.5 Mol %) | 60 | 35 | 2 |
| K | D | AN/AAm/MAA | 60 | 35 | 2.5 |
| L |  |  | 60 | 35 | 1.5 |

TABLE 6

|  | Precursor fiber bundyle | Single fiber fineness [dtex] | Calorific value per unit mass [kJ/kg] | 1H-NMR Half-value width [kHz] | Flame-proof time [Minute] | Density of flame-proofed fiber [g/cm3] | Strand strength [MPa] | Strand elastic modulus [GPa] |
|---|---|---|---|---|---|---|---|---|
| Example 16 | A | 2.5 | 3400 | 12.5 | 70 | 1.352 | 4390 | 251 |
| Example 17 |  |  |  |  | 90 | 1.400 | 4280 | 260 |
| Example 18 | B | 2.5 | 3220 | 12.6 | 70 | 1.345 | 4280 | 232 |
| Example 19 |  |  |  |  | 90 | 1.395 | 4120 | 241 |
| Example 20 | C | 2.5 | 3250 | 12.5 | 70 | 1.352 | 4210 | 241 |
| Example 21 |  |  |  |  | 90 | 1.392 | 4150 | 247 |
| Example 22 | D | 2.5 | 3360 | 12.5 | 70 | 1.355 | 4240 | 246 |
| Example 23 |  |  |  |  | 90 | 1.398 | 4350 | 248 |
| Example 24 | E | 2.5 | 3460 | 12.5 | 70 | 1.352 | 4320 | 260 |
| Example 25 |  |  |  |  | 90 | 1.402 | 4180 | 256 |
| Comparative Example 15 | F | 3 | 2970 | 12.5 | 70 | 1.351 | 4160 | 223 |
| Comparative Example 16 |  |  |  |  | 90 | 1.388 | 1460 | 221 |

TABLE 6-continued

|  | Precursor fiber bundyle | Single fiber fineness [dtex] | Calorific value per unit mass [kJ/kg] | 1H-NMR Half-value width [kHz] | Flame-proof time [Minute] | Density of flame-proofed fiber [g/cm3] | Strand strength [MPa] | Strand elastic modulus [GPa] |
|---|---|---|---|---|---|---|---|---|
| Example 26 | G | 3 | 3270 | 12.5 | 70 | 1.349 | 4300 | 247 |
| Example 27 |  |  |  |  | 90 | 1.400 | 4140 | 245 |
| Comparative Example 17 | H | 1.5 | 3930 | 12.5 | 70 | 1.365 | 4700 | 261 |
| Comparative Example 18 |  |  |  |  | 90 | 1.414 | 4410 | 257 |
| Comparative Example 19 | I | 4 | 2950 | 12.5 | 70 | 1.348 | 3490 | 222 |
| Example 28 | J | 2 | 3600 | 13.2 | 60 | 1.353 | 4780 | 257 |
| Comparative Example 20 | K | 2.5 | 3160 | 14.9 | 60 | 1.354 | 3800 | 216 |
| Comparative Example 21 | L | 1.5 | 3730 | 15 | 60 | 1.358 | 4900 | 260 |

TABLE 7

|  | Example 29 | Example 30 | Comparative Example 22 | Comparative Example 23 | Comparative Example 24 | Comparative Example 25 | Comparative Example 26 | Comparative Example 27 |
|---|---|---|---|---|---|---|---|---|
| AN (Mol %) | 98.5 | 98 | 98.5 | 96 | 96 | 96 | 96 | 96 |
| HEMA (Mol %) | 1.5 | 2 | 1.5 | — | — | — | — | — |
| AAm (Mol %) | — | — | — | 3 | 3 | 3 | 3 | 3 |
| MAA (Mol %) | — | — | — | 1 | 1 | 1 | 1 | 1 |
| Hole number of spinning nozzle | 24000 | 24000 | 12000 | 24000 | 60000 | 12000 | 3000 | 24000 |
| Hole diameter of spinning nozzle (μm) | 60 | 60 | 60 | 60 | 45 | 75 | 75 | 75 |
| Discharge magnification (times) | 0.32 | 0.32 | 0.18 | 0.32 | 0.36 | 0.59 | 0.61 | 0.51 |
| Stretching magnification (times) upon washing with water | 5.4 | 5.4 | 5.4 | 5.4 | 5.3 | 4.8 | 5.9 | 5.4 |
| Dry heat stretching magnification (times) | 1.34 | 1.34 | 1.34 | 1.3 | 1.7 |  |  | 1.34 |
| Steam stretching magnification (times) |  |  |  |  |  | 2.7 | 2.1 |  |
| Total stretching magnification (times) | 7.4 | 7.4 | 7.4 | 7.3 | 9 | 12.7 | 12.5 | 7.4 |
| Flame-proof time (minutes) | 70 | 70 | 300 | 300 | 70 | 60 | 60 | 60 |
| Carbon fiber fineness (dtex) | 1.3 | 1.3 | 2.4 | 1.4 | 0.53 | 0.67 | 0.69 |  |
| Roundness | 0.75 | 0.75 | 0.73 | 0.75 | 0.63 | 0.95 | 0.81 |  |
| Depth of wrinkle (nm) | 49.8 | 50 | 41.9 | 45 | 32.2 | 94 | 123 |  |
| Passing through burning step | ◯ | ◯ | ◯ | ◯ | ◯ | ◯ | ◯ | X |
| Strand strength (Mpa) | 4300 | 4200 | 3200 | 3800 | 4900 | 5000 | 4400 |  |
| Strand elastic modulus (Gpa) | 233 | 232 | 231 | 240 | 255 | 244 | 244 |  |
| Elevation height (mm) | 126 | 125 | 163 | 125 | 90 | 82 | 80 |  |
| Resin impregnation time (minutes) | 9 | 9 | 9 | 9 | 15 | 15 | 12 |  |
| Impregnation with resin | ◯ | ◯ | ◯ | ◯ | X | X | X |  |

TABLE 8

|  |  | Example 31 | Example 32 | Comparative Example 28 | Comparative Example 29 | Comparative Example 30 | Comparative Example 31 | Comparative Example 32 |
|---|---|---|---|---|---|---|---|---|
| resin | jER828 | 55 | 55 | 55 | 55 | 55 | 40 | 55 |
|  | AER4152 | 45 | 45 | 45 | 45 | 45 | 60 | 45 |
| Thermoplastic resin | Vinylec E | 2 | 2 | 2 | 2 | 2 | 2 | 2 |
| Curing aid | DCMU | 1.33 | 1.33 | 1.33 | 1.33 | 1.33 | 1.33 | — |
|  | PDMU | — | — | — | — | — | — | 4 |
| Curing agent | DICY | 5.33 | 5.33 | 5.33 | 5.33 | 5.33 | 5.33 | 5.33 |

TABLE 9

|  |  | Unit | Example 31 | Example 32 | Comparative Example 28 | Comparative Example 29 | Comparative Example 30 | Comparative Example 31 | Comparative Example 32 |
|---|---|---|---|---|---|---|---|---|---|
| CF | Weight per unit | mg/m | 2970 | 2768 | 2899 | 2752 | 3750 | 3750 | 3750 |
|  | Density | g/cm$^3$ | 1.804 | 1.779 | 1.809 | 1.776 | 1.81 | 1.81 | 1.81 |
|  | Strength | MPa | 4226 | 3489 | 3989 | 3283 | 4116 | 4116 | 4116 |
|  | Elastic modulus | GPa | 229 | 246 | 227 | 232 | 235 | 235 | 235 |
|  | Fiber number | Number/tow | 24000 | 12000 | 24000 | 12000 | 50000 | 50000 | 50000 |
|  | Single fiber | dte | 1.24 | 2.01 | 1.21 | 2.29 | 0.75 | 0.75 | 0.75 |
|  | Roundness |  | 0.75 | 0.83 | 0.95 | 0.95 | 0.70 | 0.70 | 0.70 |
| Resin | Flow rate | 1/Pa | 5420 | 5420 | 5420 | 5420 | 5420 | 1941 | 2123 |
| Prepreg | FAW | g/m$^2$ | 213 | 211 | 208 | 202 | 210 | 203 | 205 |
|  | RC | % | 33.9 | 34.0 | 32.2 | 32.8 | 33.9 | 33.1 | 34.3 |

TABLE 9-continued

| | Unit | Example 31 | | Example 32 | | Comparative Example 28 | Comparative Example 29 | Comparative Example 30 | | Comparative Example 31 | | Comparative Example 32 | |
|---|---|---|---|---|---|---|---|---|---|---|---|---|---|
| 0° Compression [Note 1] | Laminated number | ply | 6 | 10 | 6 | 10 | 6 | 6 | 6 | 10 | 6 | 10 | 6 | 10 |
| | Strength | MPa | 1424 | 1390 | 1420 | 1402 | 1306 | 1335 | 1541 | 1271 | 1549 | 1349 | 1521 | 1339 |
| | Elastic modulus | GPa | 118 | 119 | 119 | 113 | 111 | 112 | 118 | 117 | 119 | 117 | 117 | 115 |
| | Strength retention rate [Note 2] | % | 97.6 | | 98.7 | | | | 82.5 | | 87.1 | | 88.0 | |

[Note 1] Vf56% conversion
[Note 2] Strength retention rate = 10 ply strength/6 ply strength × 100

EXPLANATION OF REFERENCE NUMERALS

5: Carbon fiber bundle
6: Impregnation height
7: Clip
8: Ruler
9: Formamide
10: Angle
11: Forming die
12: Carbon fiber fabric
13: Spiral tube
14: Medium
15: Peel ply
16: Bag film
17: Sealing material
18: Suction spout of vacuum pump
19: Valve
20: Discharge spout of resin

INDUSTRIAL APPLICABILITY

The carbon fiber bundle of the present invention can be used in many fields including materials for aviation and aerospace such as airplanes and rockets, materials for sports such as tennis rackets, golf shafts and fishing rods, materials for transporting machines such as ships and automobiles, materials for electronic parts such as housing parts of mobile phones and personal computers, and materials for electrodes of fuel cells.

The invention claimed is:

1. A carbon-fiber-precursor acryl fiber bundle, comprising:
a polyacrylonitrile-based copolymer comprising from 95 to 99 mol % of an acrylonitrile unit and from 1 to 5 mol % of a hydroxyalkyl (meth)acrylate unit,
wherein the fiber bundle has a single-fiber fineness of from 1.5 dtex to 3.0 dtex and a roundness of 0.9 or less in a cross-section shape perpendicular to a fiber axis of the single fiber,
wherein the roundness is a value determined using equation (1): roundness=$4\pi S/L^2$, wherein S is a cross-sectional area of the single fiber and L is a circumferential length of the single fiber, and S and L are obtained by observing, under an SEM, the cross-section of the single fiber perpendicular to the fiber axis of the single fiber and analyzing the obtained image, and
wherein when a constant velocity temperature rising exothermic curve is from 30° C. to 450° C. measured at a temperature rising rate of 10° C./minute in air flow at 100 ml/minute at 30° C. and 0.10 MPa using a heat flux type differential scanning calorimeter;
a heat quantity Ja obtained by integrating an exothermic velocity from 230° C. to 260° C. of the constant velocity temperature rising exothermic curve is from 100 kJ/kg to 250 kJ/kg; and
a heat quantity Jb obtained by integrating an exothermic velocity from 260° C. to 290° C. is from 550 kJ/kg to 1050 kJ/kg.

2. The fiber bundle according to claim 1, wherein the roundness is from 0.8 to 0.9.

3. The fiber bundle according to claim 1, wherein a melting point under heat and humidity of the polyacrylonitrile-based copolymer is from 160 to 175° C.

4. The fiber bundle according to claim 1 wherein a water contact angle is from 40° to 70°.

5. The fiber bundle according to claim 4, wherein an oxidation depth De is from 4.0 μm to 6.0 μm in the polyacrylonitrile-based copolymer, and the oxidation depth De is obtained by a method comprising:
dissolving the polyacrylonitrile-based copolymer at a concentration of 25% by mass in dimethylformamide to prepare a copolymer solution;
applying the copolymer solution onto a glass plate;
drying the glass plate on which the copolymer solution was applied in air at 120° C. for 6 hours to evaporate dimethylformamide and make a film having a constant thickness in the range of from 20 μm to 40 μm;
flame-proof treating by treating the obtained film with heat in air at 240° C. for 60 minutes and further in air at 250° C. for 60 minutes to obtain a flame-proofed film;
embedding the flame-proofed film in a resin followed by polishing to obtain a polished flame-proofed film;
observing a cross-section perpendicular to a surface of the polished flame-proofed film at a magnification of 1500 using a fluorescence microscope; and
observing an oxidation progressing part as a relatively dark layer and observing an oxidation non-progressing part as a relatively light layer in the cross-section, thus a distance from the surface of the polished flame-proofed film to a boundary between the dark layer and the light layer is measured at least at 5 points on one cross-section, the same measurement is further repeated on three cross-sections, and their arithmetic average is used as the oxidation depth De (μm).

6. The fiber bundle according to claim 1, wherein the heat quantity Ja is from 100 kJ/kg to 160 kJ/kg.

7. The fiber bundle according to claim 1, wherein a calorific value per unit mass at 215 to 300° C. obtained by a measurement using a heat flux type differential scanning calorimeter is 3200 kJ/kg or more wherein a temperature rising rate in the measurement using the heat flux type differential scanning calorimeter is 2° C./minute and an atmosphere is air and
wherein a half-value width of solid $^1$H-NMR spectra at a measurement temperature of 160° C. is from 10.0 kHz to 14.5 kHz.

8. The fiber bundle according to claim 7, wherein the calorific value at 215 to 300° C. is 3300 kJ/kg or more.

9. The fiber bundle according to claim 7, wherein the half-value width is from 10.0 kHz to 13.5 kHz.

10. A method for flame-proof treatment, comprising treating the carbon-fiber-precursor acryl fiber bundle according to any one of claims 1, 4, 7, 8, or 9 under an oxidation atmosphere at temperature of from 220° C. to 300° C. for from 30 minutes to 90 minutes or less to obtain a flame-proofed fiber bundle having a fiber density of from 1.35 g/cm$^3$ to 1.43 g/cm$^3$.

11. A method of producing a carbon fiber bundle having a diameter Di of 8 μm or more and a roundness of a shape of 0.90 or less in a cross-section perpendicular to a fiber axis of a single fiber, the method comprising:
  flame-proof treating the carbon-fiber-precursor acryl fiber bundle according to any one of claims 1, 4, 7, 8, or 9 under an oxidation atmosphere at temperature of from 220° C. to 300° C. for from 30 minutes to 90 minutes to obtain a flame-proofed fiber bundle having a fiber density of from 1.35 g/cm$^3$ to 1.43 g/cm$^3$; and
  further carbonizing the flame-proofed fiber bundle at temperature of from 800° C. to 2000° C. in an inert gas, wherein the diameter Di is as measured by:
  preparing a sample, wherein a carbon fiber bundle cut into a length of 5 cm is embedded in an epoxy resin, wherein epomount base: epomount curing agent=100:9 by mass ratio, and cut into a length of 2 cm to expose a cross-sectional surface, to which a mirror surface treatment is given;
  performing an etching treatment to the cross-sectional surface of the sample with a Plasma Etching Apparatus JP-170 manufactured by JEOL Ltd. under an atmosphere of Ar/O$_2$=75/25, a plasma output power of 50 W, a vacuum degree of about 120 Pa, and a treatment time period of 5 minutes;
  observing under SEM, wherein the cross-sectional surface of the samples obtained by the preparing and the performing is observed using SEM PHILIPS FEI-XL20, and five photographs of 5 or more fiber cross-sections on an image are taken randomly; and
  measuring a diameter of a single fiber cross-section in a carbon fiber bundle, wherein for each sample, 20 single fiber cross-sections from the 5 SEM photographs, wherein 3 or more single fiber cross-sections from one photograph, are randomly selected, a contour of the fiber cross-section is traced using an image analysis software Image-ProPLUS, manufactured by Nippon Roper K.K., a major axis d, which is a maximum feret diameter of the cross-section, is measured, and a mean value of the major axes of all single fiber cross-sections selected is the diameter Di of the single fiber in the carbon fiber bundle.

* * * * *